(12) United States Patent
Chavez et al.

(10) Patent No.: US 11,534,277 B2
(45) Date of Patent: Dec. 27, 2022

(54) VARIOUS STRUCTURED SUPPORTS FOR 3D PRINTED ALIGNERS/MOUTH PIECES

(71) Applicant: Align Technology, Inc., San Jose, CA (US)

(72) Inventors: Jennifer Chavez, Fremont, CA (US); Peter Webber, Redwood City, CA (US); Zhou (Jonelle) Yu, Fremont, CA (US); Tzishing Jesse Lim, Mountain View, CA (US); Luyao Cai, Santa Clara, CA (US); Eric Yau, Santa Clara, CA (US)

(73) Assignee: Align Technology, Inc., San Jose, CA (US)

( * ) Notice: Subject to any disclaimer, the term of this patent is extended or adjusted under 35 U.S.C. 154(b) by 337 days.

(21) Appl. No.: 16/829,801

(22) Filed: Mar. 25, 2020

(65) Prior Publication Data

US 2020/0306017 A1 Oct. 1, 2020

Related U.S. Application Data

(60) Provisional application No. 62/824,069, filed on Mar. 26, 2019, provisional application No. 62/823,076, filed on Mar. 25, 2019.

(51) Int. Cl.
*A61C 13/00* (2006.01)
*A61C 7/00* (2006.01)
(Continued)

(52) U.S. Cl.
CPC .......... *A61C 13/0013* (2013.01); *A61C 7/002* (2013.01); *A61C 7/08* (2013.01);
(Continued)

(58) Field of Classification Search
CPC ....... A61C 13/0013; A61C 7/002; A61C 7/08; B33Y 10/00; B33Y 80/22; B33Y 40/20
See application file for complete search history.

(56) References Cited

U.S. PATENT DOCUMENTS 5,725,376 A * 3/1998 Poirier ................. A61C 9/0053
433/172
8,209,044 B2 * 6/2012 Inoue .................... B29C 64/153
700/98

(Continued)

FOREIGN PATENT DOCUMENTS

CN 105997274 A 10/2016
EP 3984496 A1 4/2022
(Continued)

*Primary Examiner* — Nicholas D Lucchesi
(74) *Attorney, Agent, or Firm* — FisherBroyles, LLP

(57) ABSTRACT

A support is coupled to an appliance to decrease warpage. The support may comprise a plurality of extensions coupled to the appliance to decrease warpage. The extensions can be coupled to the appliance at one or more of many locations, such as on an occlusal surface, a wall, an edge or an interior of the appliance. In some embodiments, the extensions are coupled to walls of the appliance such as a buccal wall and a lingual wall, and the extensions can be coupled to the walls of the appliance near edges of the walls, such as gingivally facing edges of the walls that are oriented toward the gingiva when the appliance is worn.

18 Claims, 28 Drawing Sheets

(51) Int. Cl.
*A61C 7/08* (2006.01)
*B33Y 10/00* (2015.01)
*B33Y 80/00* (2015.01)
*B33Y 40/20* (2020.01)

(52) U.S. Cl.
CPC .............. *B33Y 10/00* (2014.12); *B33Y 40/20* (2020.01); *B33Y 80/00* (2014.12)

(56) References Cited

U.S. PATENT DOCUMENTS

| | | | | |
|---|---|---|---|---|
| 9,943,386 | B2* | 4/2018 | Webber | B33Y 80/00 |
| 10,011,079 | B2* | 7/2018 | Wighton | B29C 64/40 |
| 10,265,146 | B2* | 4/2019 | Reichert | B28B 11/243 |
| 2008/0241798 | A1* | 10/2008 | Holzner | A61C 13/0013 |
| | | | | 433/223 |
| 2009/0202378 | A1* | 8/2009 | Illston | B22F 10/20 |
| | | | | 419/1 |
| 2010/0291509 | A1* | 11/2010 | Berggren | A61C 13/0022 |
| | | | | 433/199.1 |
| 2012/0148985 | A1* | 6/2012 | Jung | A61C 13/08 |
| | | | | 433/212.1 |
| 2015/0093720 | A1* | 4/2015 | Beeby | A61C 13/0004 |
| | | | | 419/28 |
| 2016/0081769 | A1 | 3/2016 | Kimura et al. | |
| 2017/0007359 | A1 | 1/2017 | Kopelman | |
| 2018/0304541 | A1 | 10/2018 | Barth | |
| 2019/0336254 | A1* | 11/2019 | Hasan | A61C 13/08 |
| 2020/0086553 | A1* | 3/2020 | Mojdeh | B29C 64/40 |

FOREIGN PATENT DOCUMENTS

| | | |
|---|---|---|
| WO | 2017006173 A1 | 1/2017 |
| WO | 2017006176 A1 | 1/2017 |
| WO | 2017006178 A1 | 1/2017 |
| WO | 2017006179 A1 | 1/2017 |
| WO | 2017007962 A1 | 1/2017 |
| WO | 2017007964 A1 | 1/2017 |
| WO | 2019006409 A1 | 1/2019 |

* cited by examiner

VARIOUS STRUCTURED SUPPORTS FOR 3D PRINTED ALIGNERS/MOUTH PIECES

RELATED APPLICATIONS

This application claims the benefit under 35 U.S.C. § 119(e) of U.S. Provisional Patent Application No. 62/823,076, filed Mar. 25, 2019, and of U.S. Provisional Patent Application No. 62/824,069, filed Mar. 26, 2019, both applications titled "VARIOUS STRUCTURED SUPPORTS FOR 3D PRINTED ALIGNERS/MOUTH PIECES," the disclosures of which are incorporated, in their entirety, by this reference.

BACKGROUND

Dental appliances can be worn by people for many reasons, such as for safety or to treat a condition of a patient. For example, dental appliances such as mouth pieces can be worn by athletes. There a several conditions that can be treated with dental appliances. For example, a series of aligners can be worn to move teeth from an initial position to a desired position. Appliances may also be worn for expanding the patient's palate, advancing the mandibular jaw, treating sleep apnea, and retracting cheeks of the patient.

Although deposition processes such as 3D printing have been proposed for the direct manufacture of these appliances, at least some of the prior approaches to deposition manufacturing can be less than ideal. Work in relation to the present disclosure suggests that with at least some of the prior approaches to direct fabrication of dental appliances, there may be locations on the appliance that contain artifacts related to the direct fabrication process. These artifacts can result in rough or uneven surfaces on at least a portion of the appliance in some instances. Although these rough or uneven surfaces can be processed to smooth the dental appliance, this can increase the amount of time to manufacture an appliance and can result in non-uniformity of the appliance in at least some instances. Also, because teeth can have uneven surfaces, the prior methods and apparatus for deposition manufacturing may result in uneven or incomplete formation of the appliance in some instances. For example, teeth may have complex surfaces and at least some of the prior approaches to additive manufacturing may result in the formation of unsupported islands during deposition, which can result in defects in at least some instances.

With some approaches to additive manufacturing, an appliance may not be fully cured when removed from the additive manufacturing machine, and at least some of the prior approaches are less than ideally suited for removing the appliance from the additive manufacturing machine and for handling the appliance when removed. Also, because the appliance may not be fully cured when removed from the additive manufacturing machine, work in relation to the present disclosure suggests that some warpage may occur after the appliance has been removed from the additive manufacturing machine in at least some instances.

In light of the above, there is a need for improved methods of manufacturing dental appliances that overcome at least some of the above-mentioned limitations of the prior approaches.

SUMMARY

The methods, apparatuses and appliances of the present disclosure are directed to decreasing artifacts and warpage on appliances related to the manufacturing of dental appliances.

In some embodiments, a support is coupled to an appliance to decrease warpage. The support may comprise a plurality of extensions coupled to the appliance to decrease warpage. The extensions can be coupled to the appliance at one or more of many locations, such as on an occlusal surface, a wall, an edge or an interior of the appliance. In some embodiments, the extensions are coupled to walls of the appliance such as a buccal wall and a lingual wall, and the extensions can be coupled to the walls of the appliance near edges of the walls, such as a gingivally facing edges of the walls that are oriented toward the gingiva when the appliance is worn.

In some embodiments, a precursor to an appliance is formed, in which the precursor comprises the support coupled to the appliance. The support may comprise a holder and one or more extensions extending from the holder to the appliance. In some embodiments, the holder is formed on a retainer of the additive manufacturing machine such as a build plate. In some embodiments, the holder and support facilitate additional manufacturing steps while the holder and the appliance remain on the retainer. The holder can facilitate removal of the appliance from the retainer, handling of the appliance subsequent to removal, and provide structural support to the appliance subsequent to removal, as well as provide structural support that helps maintain appliance accuracy for usage.

In some embodiments, the plurality of extensions is coupled to an occlusal surface of the appliance with a gap between the occlusal surface of the appliance and the holder.

In some embodiments, an occlusal surface of the appliance is inclined at an angle relative to layers of material deposited during the additive manufacturing of the appliance. The layers of material indicate a direction of deposition of the layers during additive manufacturing of the appliance. The appliance can be inclined at any suitable angle relative to the direction of deposition.

In some embodiments, the support is formed, and a portion of the appliance is generated on the support prior to coupling the supported portion of the appliance to other supported portions of the appliance. This approach can be helpful where the dentition comprises inflections or other details that could otherwise result in the corresponding portion of the appliance not being appropriately coupled to the additive manufacturing machine, which could potentially result in a defect in the appliance.

In some embodiments, an edge along a wall of the appliance is coupled to a support structure at one or more locations to support the appliance during manufacturing. Coupling to the appliance along or near the edge can decrease interference from artifacts related to the deposition manufacturing of the appliance such as three-dimensional "3D" printing of the appliance. Coupling the appliance to the support near the edge allows the appliance to be readily decoupled from the support with fewer artifacts when the support has been decoupled from the appliance.

In some embodiments, the support comprises an extension coupled to a removal line. The removal line of the appliance corresponds to a location where the appliance has been separated from the support. The removal line can be located between the appliance the support between an occlusal surface of the teeth and a gingival line of the patient. In some embodiments, the removal line is located along at least a portion of gingival line, a cut line, or a terminal molar of the appliance. This approach can decrease the amount of post formation manufacturing of the appliance such as laser cutting or polishing. The support can be coupled to locations of the appliance corresponding to the removal line in order to decrease visibility of artifacts when the support has been decoupled from the appliance.

INCORPORATION BY REFERENCE

All patents, applications, and publications referred to and identified herein are hereby incorporated by reference in their entirety and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

The following detailed description provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The methods, apparatus and dental appliances disclosed herein are well suited for combination and incorporation with many known prior dental appliances and applications, such as an aligner for aligning a plurality of teeth, a retainer, a palatal expander, a bracket for placing attachments on a plurality of teeth, an attachment for coupling to teeth, a mandibular relocation appliance, a mandibular advancement appliance, a retainer with palatal support, a Theroux device such as a Theroux retainer, a nightguard, a functional appliance, and a 3D printed aligner thermoforming mold. The presently disclosed methods, apparatus and appliances are well suited for direct fabrication with deposition manufacturing, such as 3D printing, fused deposition modeling, stereo lithography (SLA), digital light projector (DLP) printing, continuous DLP, inkjet spray, and metal printing. Also, the presently disclosed methods and apparatus are well suited for the additive manufacturing of different materials onto a single appliance, such as inkjet printing with a plurality of different materials to print an appliance comprising a plurality of different materials. Although reference is made to the manufacture of dental appliances, the methods, apparatus and appliances disclosed herein are well suited for other fields, such as orthopedics, manufacturing jigs, and thermoforming molds.

Figure 1:
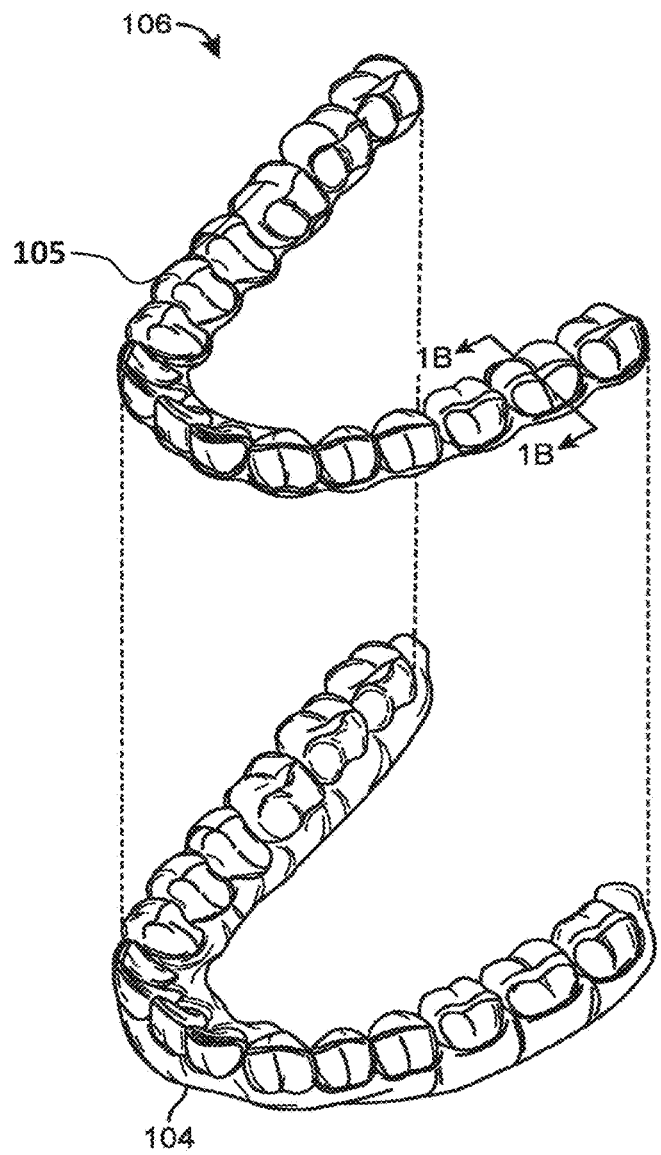
FIG. 1 shows a dental appliance that can be directly fabricated in accordance with some embodiments.
Figure 2:
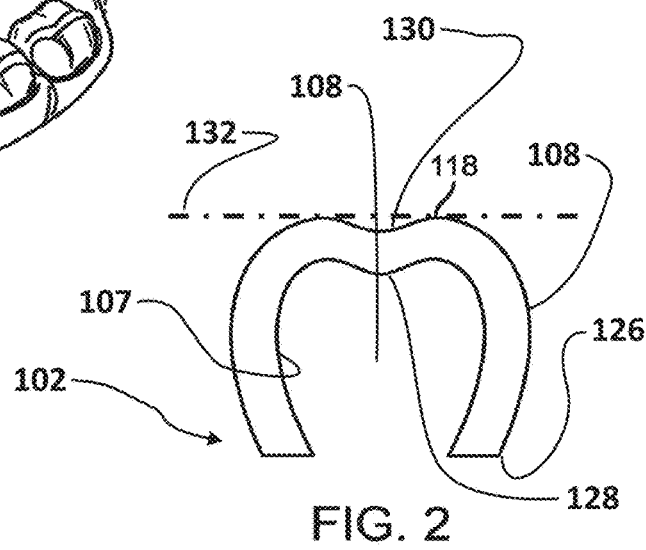
FIG. 2 shows the cross-section of the dental appliance from FIG. 1.

FIG. 1 illustrates an exemplary dental appliance 106 and jaw 104 including a patient's teeth. FIG. 2 illustrates dental appliance cross-section 118 of appliance 106 as taken along line 1B-1B of FIG. 1. The dental appliance 106 may be sized and shaped to fit over a plurality of teeth present in an upper or lower jaw. The dental appliance 106 may comprise any suitable material such as one or more of an organic material, polymer, inorganic material, metal, or ceramic, and combinations thereof. In some embodiments, dental appliance 106 comprises a plurality of teeth receiving cavities to hold the appliance on the teeth of the patient, for example with a retainer, palatal expander or aligner. In some embodiments, dental appliance 106 comprises a plurality of teeth receiving cavities and wall thickness and strength suitable for repositioning a plurality of teeth. In some embodiments the appliance 106 comprises a polymeric shell thickness of no more than about 2 millimeters, and, in some embodiments, the polymeric shell may thickness may be with a range from about 0.2 millimeter to about 2 millimeters. The appliance 106 such as a polymeric shell appliance may comprise a plurality of layers. As illustrated, the dental appliance 106 may have a generally U-shaped cross-section 118 to form one or more teeth receiving cavities 109 shaped to receive one or more teeth of a patient. The dental appliance 106 may comprise a thickness extending between an interior surface 107 shaped to receive a tooth and the exterior surface 108 facing away from the tooth. In some embodiments, the exterior surface 108 comprises an occlusal surface 105 to engage an opposing appliance or opposing teeth on an opposite side of the mouth. The occlusal surface 105 of appliance 106 generally extends along an occlusal plane 132. The methods and apparatus disclosed herein may be used to print the dental appliance 106 with additive manufacturing.

Although the cross-section shown in FIG. 1 shows a portion of the appliance extending across the tooth, in some embodiments, the appliance extends between teeth. The dimensions of the cross-section of the appliance can vary in accordance with the shape of patient's teeth. For example, an exterior surface of the appliance may protrude outwardly near a midline of a tooth, and intrude slightly at mesial locations near a space between teeth. The methods, apparatus and appliances disclosed herein are well suited for addressing variations in geometry of a patient's dentition.

Although the embodiment of FIG. 1 illustrates a dental appliance in the form of an aligner, other types of dental appliances are suitable for use. For example, dental appliance 106 may comprise a retainer, a palatal expander, a bracket for placing attachments on a plurality of teeth, an attachment for coupling to teeth, a nightguard, a functional appliance, or a 3D printed aligner thermoforming mold.

The methods and apparatus disclosed herein are well suited for combination with many types of additive manufacturing such as three-dimensional ("3D") printing. At least some additive manufacturing machines and 3D printers comprise an internal retainer, such as a platform, upon which the part is formed. While the 3D printer can be configured in many ways, in some embodiments the retainer moves while the part is formed and light is directed to a curable material that solidifies for form the part in response to light. As the deposition process continues, the retainer moves relative to the print head to deposit additional layers. The retainer and print head of the 3D printer can be oriented in many ways, for exampling in a vertical orientation, a horizontal orientation or an oblique orientation. For example, the print head can be located beneath the retaining surface. In general, the 3D printing process prints a single substantially planar layer at a time that is generally parallel to the retainer surface, such as a platform. After printing a layer, the distance between the retaining surface and print head increases to print a new layer. The retaining surface may move away from the print head, or vice versa, and combinations thereof. In general, each successive layer is built on top of the previous layer. The layers are successively deposited along a direction of deposition, which is substantially perpendicular to each of the deposited layers.

Figure 3:
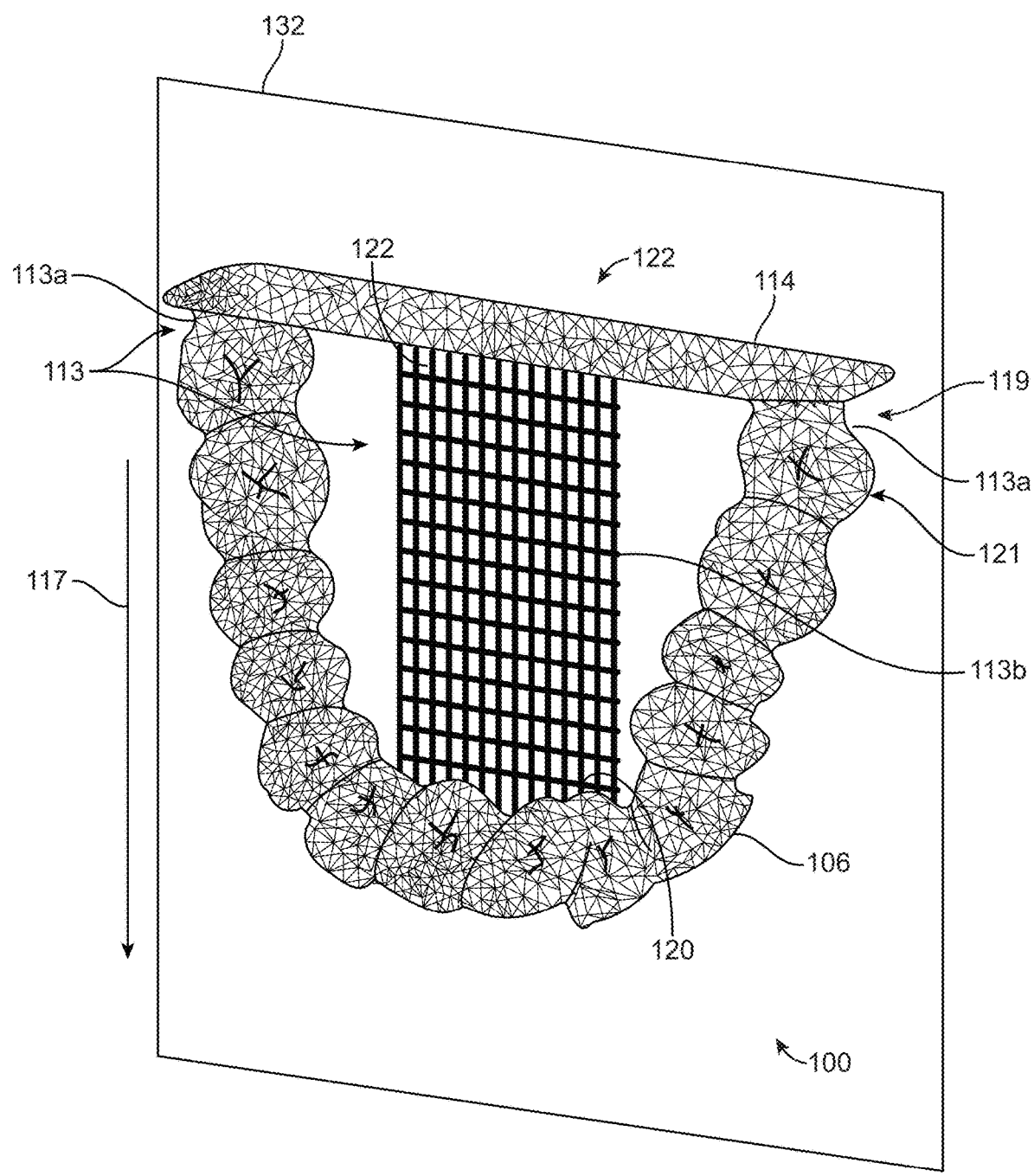
FIG. 3 shows a precursor to a dental appliance manufactured with accordance with some embodiments.

FIG. 3 illustrates an appliance precursor 100, in accordance with some embodiments. The dental appliance precursor 100 can be printed in layers along a direction of deposition 117. The layers are generally perpendicular to the direction of deposition 117. While the direction of deposition can be oriented in many ways, the layers can be perpendicular to an occlusal plane 132 of the dental appliance 106. The dental appliance precursor 100 comprises a support 112 and the appliance 106. The support 112 comprises a holder 114 and one or more extensions, e.g. a plurality of extensions 113. The plurality of extensions 113 extend from the holder 114 to the dental appliance 106, and support the appliance during the printing process. The holder 114 may be printed directly to a retaining surface of an additive manufacturing device such as a three-dimensional printer. In some embodiments, the dental appliance precursor 100 may be printed vertically along the direction of deposition 117 and extend downward as shown in FIG. 3. In other embodiments, the dental appliance precursor 100 may be printed vertically from a retaining surface and extend upward. The direction of deposition can extend along any suitable direction, e.g. horizontally, vertically, or obliquely to the horizontal and vertical directions.

The holder 114 can be printed directly on the retainer of the 3D printer. In some embodiments, the plurality of extensions 113 is printed on the holder 114 and extend from the holder 114 to the dental appliance 106. The embodiment of FIG. 4 includes a plurality of three extensions 113. Outer extensions 113a couple the holder 114 to an exterior surface of the dental appliance at a location corresponding to a posterior surface 119 of a posterior tooth receiving cavity 121 shaped to receive a posterior tooth such as a molar. Inner extension 113b couples the holder 114 to an exterior surface of the dental appliance 106 at a location corresponding to a lingual edge 120 of an incisor of the dental appliance 106. The extensions 113 may comprise a plurality of perforations 122 to reduce the amount of material forming the support 112.

The one or more extensions 113 can be configured in many ways and may comprise one or more of a uniform thickness, a non-uniform thickness, voids within the extension, a hollow portion within the extension, a filled in portion within the extension, a solid filled in portion without voids, or a gradient thickness from the holder to the dental appliance.

In some embodiments, the holder 114 extends between the outer extensions 113A and 113B with the inner extension 113B coupled to the holder 114 there between. The plurality of extensions may define a plurality of gaps between the inner extension and the outer extension. The holder may comprise sufficient thickness to provide structural strength to allow handling and removal from the retainer of the 3D printer. Although the holder 114 is shown as a continuous single piece extending between the outer extensions 113A, in some embodiments, the holder comprises a plurality of separate pieces to couple the extensions to the appliance. The plurality of separate pieces can be configured in many ways, and may comprise one or more of variable thickness, perforations, or a separate material from the appliance in order to couple the extensions to the appliance.

With the additive manufacturing process as described herein, the holder 114 is printed on retaining surface of an additive manufacturing machine. The holder comprises a surface in contact with the retainer of the 3D printer while the layers of the appliance are deposited. One or more additive layers of the holder 114 contacts the retaining surface of the additive manufacturing machine. The number of layers of the holder 114 in contact with the retaining surface of the additive manufacturing machine can be related to whether the retainer surface of the 3D printer is inclined relative to the direction of deposition 117 of the plurality of layers. The holder may comprise a plurality of layers and sufficient thickness to provide strength to support the appliance during the additive manufacturing process and handling subsequent to removal from the 3D printer.

The holder can be sized and shaped in many ways. In some embodiments a portion of the holder comprises a removal structure shaped to facilitate removal of the holder from the retention structure, e.g. removal of the holder from a surface of a build platform. The removal structure of the holder may comprise one or more of an inclined surface, an overhang or other channel shaped to facilitate removal of the holder from the build platform. Providing a removal structure on the holder can facilitate removal of the holder and decrease potential stresses and possible damage to the appliance supported with the holder and the extensions of the support. For example, on the manufacturing floor, a straight edge can be advanced along a surface of the build platform between the surface of the build platform and the removal structure to separate the holder from the surface of the build platform. The straight edge can be advanced manually by an operator or with automation, for example robotically.

The plurality of extensions 113 is printed on the holder 114 so as to extend to the appliance 106. The plurality of layers forms the appliance precursor 100 on the one or more extensions of support 112, e.g. the plurality of extensions 113. The precursor 100 may then undergo further processing to become the appliance 106. In some embodiments, the dental appliance precursor comprises an intermediate part formed prior to completion of the finished dental appliance 106, which finished dental appliance is suitable for placement on a patient's teeth.

The additive manufacturing process may result in a dental appliance precursor 100 that may be processed further to obtain a finished dental appliance 106. For example, the extensions 113 may be removed from the dental appliance precursor 100 prior to use by a patient. Once the supports 112 have been removed, locations where the supports were previously attached to the dental applicant may be polished or otherwise treated to obtain a finished surface for the dental appliance. Other processes may be used such as securing additional material to the dental appliance, sterilization, and/or heat treatment.

Some embodiments of the present disclosure are directed to reducing the time and complexity of the processing of the appliance after being formed, the amount of material used to manufacture the appliance, the number of local minima within tooth receiving cavities and corresponding supporting extensions, and speeding up the overall 3D printing process. A reduction in the number of extensions 113 and associated coupling points to the appliance 106 may provide a faster post 3D printing process. The methods and apparatus disclosed herein can provide a more efficient removal of the support and extensions and reduce reliance on surface finishing while maintaining mechanical and aesthetic integrity of the resulting dental appliance 106.

The methods and apparatus described herein may use existing technology to remove the extensions 113, such as laser trimming. However, because the supports 112 are coupled to the dental appliance 106 at specific locations along the edge of the appliance, there may less finishing of the surfaces of the dental appliance 106. For example, the amount of polishing time and surface area can be reduced. The dental appliance precursor 100 manufactured from the described printing process may result in easily removed extensions 113 that may be removed on a mass manufacturing scale without requiring extensive surface finishing. Thus, it may be possible to print a dental appliance precursor 100, remove the extensions 113, and have the dental appliance 106 proceed to packaging without significant additional manufacturing processes.

Supporting the appliance along the walls with extensions can reduce the reliance supports coupled to interior and exterior surfaces of the appliance. Once removed from 3-D printer, this printed dental appliance precursor 100 can be laser trimmed to fit without surface finishing to remove surface support marks. Use of the removal line such as a gingival cut line on the dental appliance precursors is advantageous from a processing standpoint, as well as for the final product. In some embodiments, having supports only in contact with the removal line of the appliance 106 gives a clear, identifiable indication of where the separation is supposed to occur, provides improved tolerance as to how the supports are cleaned, and allows a mill or laser cutter to remove the supporting extensions.

Figure 4:
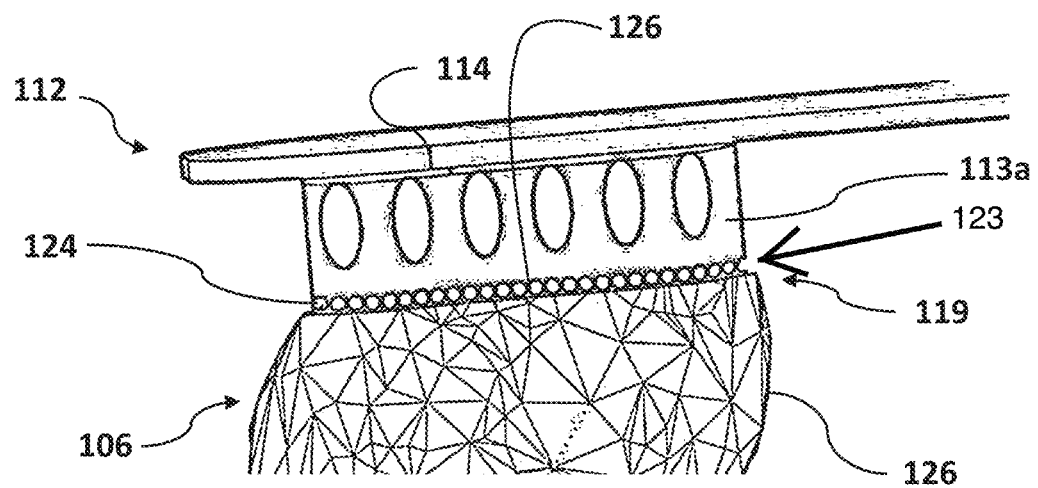
FIG. 4 shows a detailed view of precursor of FIG. 3.

FIG. 4 illustrates a detailed view of the inner extensions 113b coupled to an edge of the dental appliance 106 at a posterior surface 119.

Figure 5:
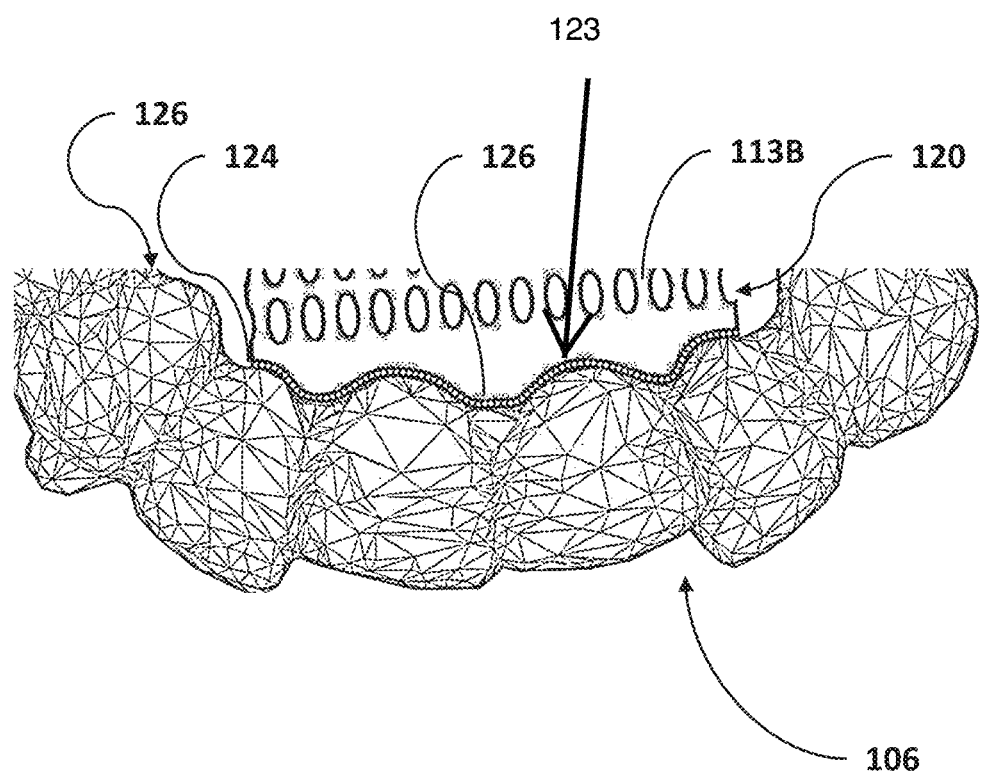
FIG. 5 shows a detailed view of the precursor of FIG. 4.

FIG. 5 illustrates a detailed view of the inner extension 113b attached to an edge of the dental appliance 106 along a lingual edge 120.

As shown in FIGS. 4 and 5, the extensions 113 may be attached to the edges of the dental appliance 106 along a removal line 124. The removal line 124 may mark a transition from the support 112 to the dental appliance 106. In some embodiments, the removal line 124 may extend along a gingival line. Alternatively or in combination, the removal line may extend along a line between the occlusal surface and a gingival line corresponding to a gingival line of a specific patient. The removal line can be configured in many ways, and may comprise a visible marker for cutting the appliance with optical guidance, such as with laser or other cutting as described herein.

In some embodiments, the removal line 124 comprises a weakened portion 123 of the dental appliance precursor 100 extending over a region between the dental appliance 106 and the extensions 113. The weakened portion 123 may include features such as a plurality of perforations, a channel, a plurality of channels, a groove, a plurality of grooves, a cavity, a plurality of cavities, a reduced cross-sectional area compared to the appliance, and a weaker material compared to the dental appliance 106 or the extensions 113. In some embodiments, the removal line 124 comprises substantially the same thickness as the appliance, such as a similar wall thickness and cross-sectional area as the wall of the appliance near the removal line. For example, in the embodiments of FIGS. 4 and 5, a plurality of perforations arranged in a line forms the removal line 124. The weakened portion of material may ease the separation between the support 112 and the dental appliance 106.

The use of different materials can facilitate removal of the appliance along the removal line. In some embodiments a material different from the appliance material is deposited along or near the removal line to facilitate separation of the appliance from the extension near the removal line. For example, the appliance can be formed with a plurality of deposition materials from an inkjet printer, in which the printer comprises an appliance material and a weaker removal material for placement near the removal line.

After printing the dental appliance precursor 100, the support 112 comprising extensions 113 may be removed from the dental appliance 106 at the removal line 124, for example by tearing the dental appliance precursor 100 at the removal line 124. Alternatively or in combination, the removal line 124 may provide an easily identifiable area for cutting using conventional techniques such as a laser cutter. Additional post separation processes can be performed, such as polishing along the separated edge.

Figure 6:
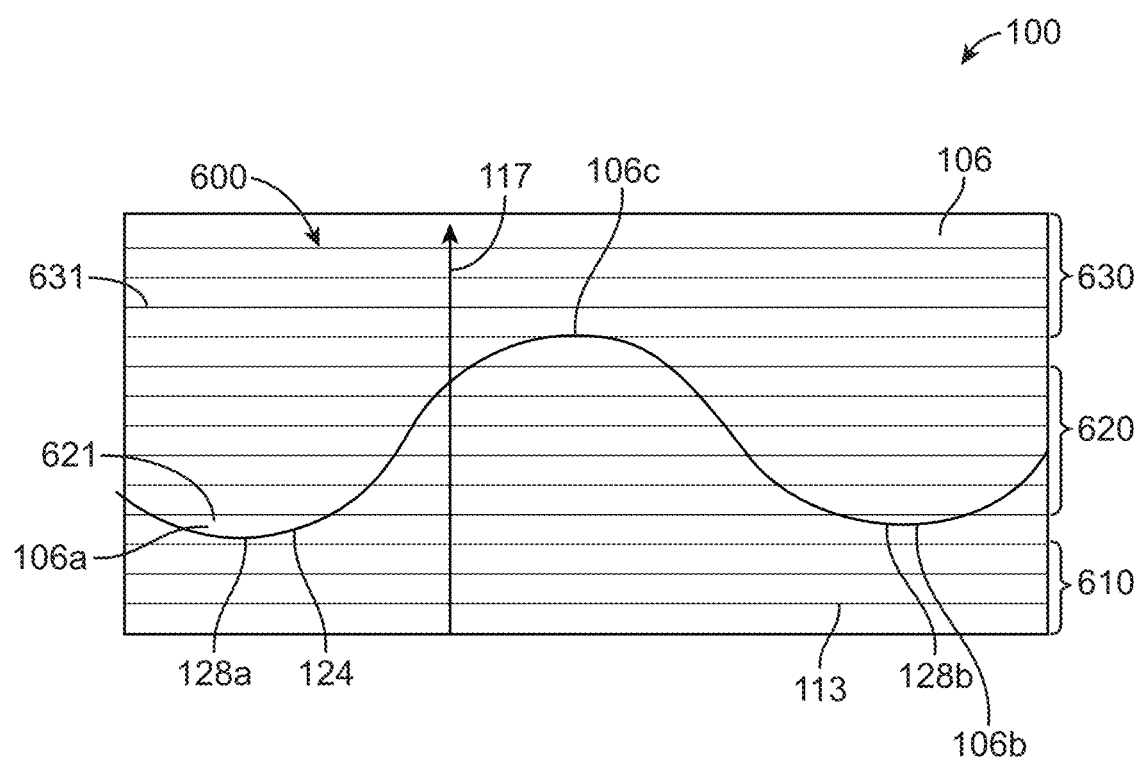
FIG. 6 shows a detailed view of a dental appliance comprising striations that occur during additive manufacturing, in accordance with some embodiments.

FIG. 6 illustrates a detailed view of a wall portion of the dental appliance precursor 100 near the removal line 124 corresponding to an edge of appliance 106. The detailed view of FIG. 6 illustrates a plurality of deposition layers 600. The plurality of deposition layers comprises a first plurality of layers 610, a second plurality of layers 620, and a third plurality of layers 630. The first plurality of layers 610 corresponds to an extension of the one or more extensions 113 of the support 112 extending from the holder. In some embodiments, the first plurality of layers 610 comprises the holder 114. In some embodiments, over 100 layers can be used to form an appliance, and the first plurality of layers may comprise any suitable number of layers.

The second plurality of layers 620 corresponds to a portion of the extension 113 and one or more portions of dental appliance 106. A layer 621 of the second plurality of layers extends through the extension 113, a first portion 106a of the appliance 106, and a second portion 106b of the appliance 106. A gap in the appliance 106 extends along layer 621 between the first portion 106a and the second portion 106b of the appliance 106. Although layer 621 is shown extending between first portion 106a and second portion 106b, in some embodiments, the extension 113 does not extend between the first portion and the second portion.

The removal line 124 extends to a first local minimum 128a and a second local minimum 128b. The extension 113 is coupled to the first portion 106a of appliance 106 at the first local minimum 128a and second portion 106c of the appliance 106 is coupled to the second local minimum 128b.

The third plurality of layers 630 corresponds to a third portion 106c of the dental appliance 106. A layer 631 of the third plurality of layers 630 extends along the third portion 106c of the appliance 106. The third portion 106c of the appliance couples the first portion 106a of the appliance to the second portion 106b of the appliance. In some embodiments, the third portion 106c of the appliance comprises the third plurality of layers, and the third plurality of layers couples to the second plurality of layers so as to couple the first portion 106a to the second portion 106b with the third portion 106c of the appliance 106. The coupling can allow the appliance to be removed from the one or more extensions 113, such that the first portion 106a remains connected to the second portion 106b.

The removal line 124 is formed between the transition from one or more of the extensions 113 to the dental appliance 106. The thickness of a location in any individual layer may be controlled by adjusting the width of the appliance and the amount of cured material added at that location, and the removal line may correspond to a change in thickness at the transition between the appliance and the extension.

The direction of deposition 117 is show extending approximately perpendicular to each of the plurality of layers. The first local minimum 128a and the second local minimum 128b of the appliance is shown in relation the direction of deposition 117. Although two local minima are shown, in some embodiments one local minimum is coupled to the wall of the appliance with the extension 113. The extension can support the appliance at the local minimum when the appliance 106 and precursor 100 have been partially formed, for example formed to a layer 621 of the second plurality of layers 620. The first portion 106a of appliance 106 near the first local minimum 128a may not be directly connected to other portions of appliance 106 when layer 621 has formed the portion 106a of the appliance. The extension 113 supports the first portion 106a of the appliance 106 near the first local minimum 128a to maintain the position of the portion of the appliance near local minimum prior to directly connecting the portion of the appliance. The extension 113 may similarly support the second portion 106b near the second local minimum 128b. Although the extension is shown to extend between the first local minimum and the second local minimum, in some embodiments voids or other gaps can be placed in extension 113 between the first local minimum and the second local minimum.

An additive manufacturing process will typically print material onto existing cured material. Depending on the type of material and the printing device, each successive layer can typically extend laterally to the direction of deposition as far as the immediately preceding layer plus a small amount of overhang. Thus, a printer can be limited in the rate of increase in surface area size of successive layers. The increasing size of successive layers can define a corresponding angle in relation to the direction of fabrication (e.g. a direction of deposition), and the extension can be sized to couple to the wall of the appliance along removal line 124 along any suitable distance. Additionally, a 3D printer may be unable to print features that correspond to local minimum without utilizing an extension to support the feature of the appliance at the local minimum, so as to inhibit the formation of islands. Work in relation to the present disclosure suggests that unsupported local minima can be related to the formation of islands, and that the presently disclosed methods and apparatus can substantially decrease and even inhibit island formation during direct fabrication of the appliance 106.

Thus, one or more extensions as described herein may be added to support locations that would otherwise be unsupported, such as the first local minimum 128a and the second local minimum 128b. In another example, if the dental appliance 106 of FIG. 2 were being printed from a gingiva end 102 toward an occlusal surface 130, local minimum 128 could rely on an extension to support it. The extension 113 would extend into a tooth receiving cavity and couple to the dental appliance at a local minimum 128.

Although FIG. 6 makes reference to a removal line 124 in the context of a removal line, local minima and layers corresponding to an edge of the appliance, the plurality of layers and removal line can be used alternatively or in combination with other embodiments disclosed herein. In some embodiments, the first local minimum 128a, the second local minimum 128b, and removal line 124 correspond to surface profile of an occlusal surface of an appliance, in which the local minima of the occlusal surface are supported with the extensions and the extensions subsequently removed from the occlusal surface as described herein.

Although extensions into a tooth receiving cavity to support a local minimum can result in more finishing than would be ideal, the methods and apparatus disclosed herein can be configured to decrease reliance on extension that extend into teeth receiving cavities, for example by determining a suitable angle of inclination of the appliance in relation to the plurality of deposition layer and the direction of deposition. Work in relation to embodiments suggests that inclining the occlusal surface of appliance 106 relative to plurality of layers can reduce or even eliminate local minima within teeth receiving cavities, which can decrease the number of removal locations and corresponding finishing subsequent to separation of the appliance from the support.

In some embodiments, the appliance is printed in an orientation that decreases the number of local minima and corresponding extensions coupled thereto. For example, the dental appliance 106 of FIG. 1 could be printed with the plurality of deposition layers inclined relative to an occlusal plane of the appliance. The angle of inclination can be within a range from about 45 degrees to about 90 degrees, and optionally within a range from about 50 degrees to about 85 degrees. The plurality of layers can be inclined relative to the occlusal plane in many ways. For example, the dental appliance 106 could be printed from a posterior portion of the appliance toward an anterior portion of the appliance, or from an anterior portion of the appliance toward a posterior portion of the appliance. Alternatively or in combination, the appliance can be printed from a labial surface toward a lingual surface.

Figure 7:
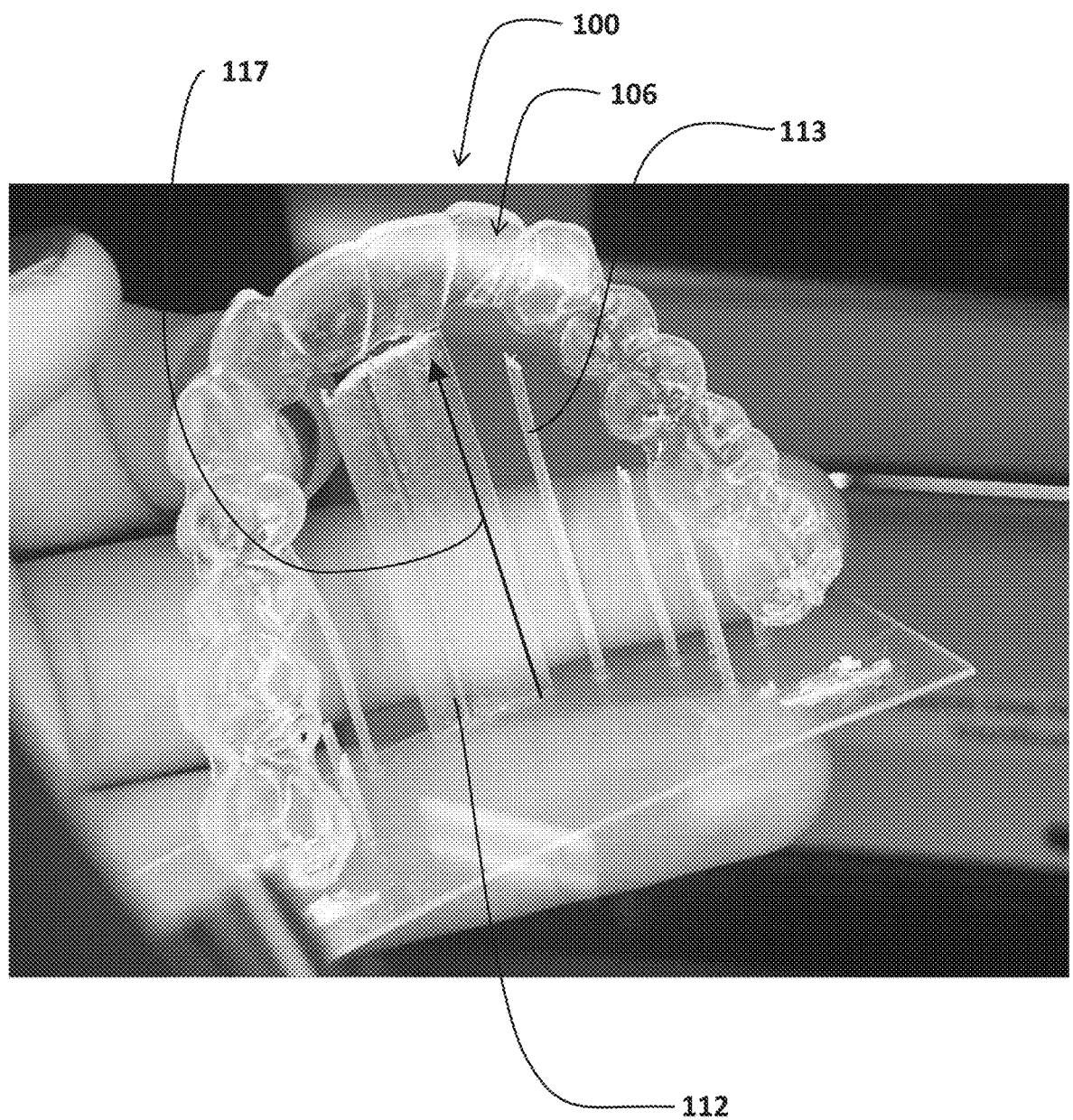
FIG. 7 shows a precursor to a dental appliance with a direction of deposition inclined relative to an occlusal surface, accordance with some embodiments.

FIG. 7 illustrates an example of a completed dental appliance precursor 100 printed in a direction of deposition 117 such that the layers of deposition are inclined in relation to the occlusal plane. The embodiment of FIG. 7 has an angle between the occlusal plane 132 and the layers to reduce the number of local minimums requiring extensions 113. In some embodiments, the angle between the occlusal plane 132 and the layers is from about 10 degrees to about 90 degrees. In some embodiments, the angle between the occlusal plane and the layers is from about 45 degrees to about 85 degrees. In still other embodiments, the angle between the occlusal plane and the layers is from about 50 degrees to about 80 degrees.

Figure 8:
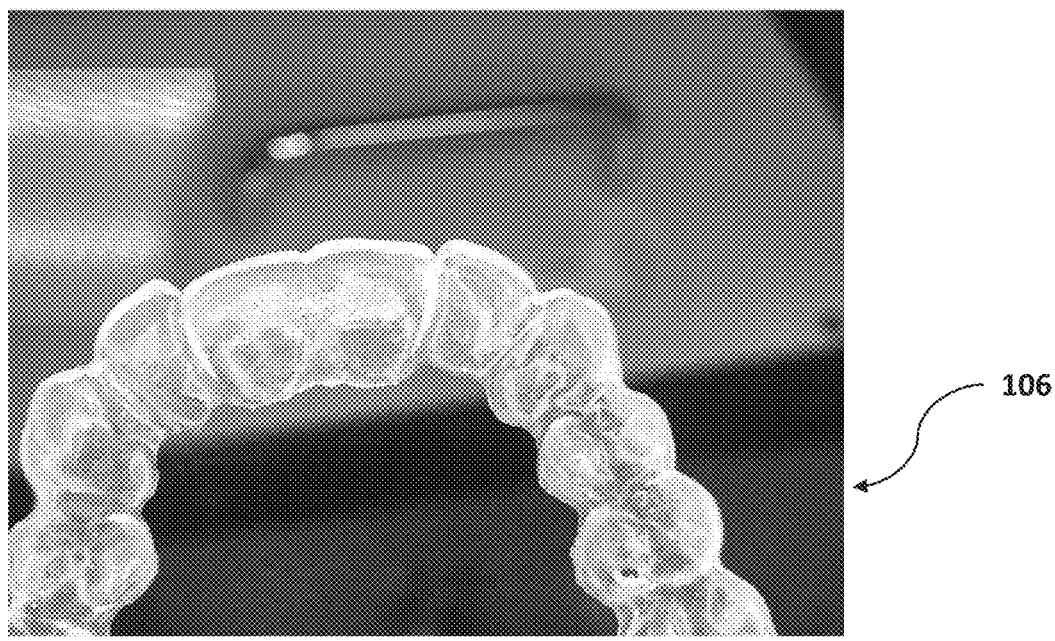
FIG. 8 shows the dental appliance of FIG. 7 separated from a support.

FIG. 8 illustrates the dental appliance precursor 100 of FIG. 7 separated from the support into to provide a separate dental appliance 106.

Figure 9:
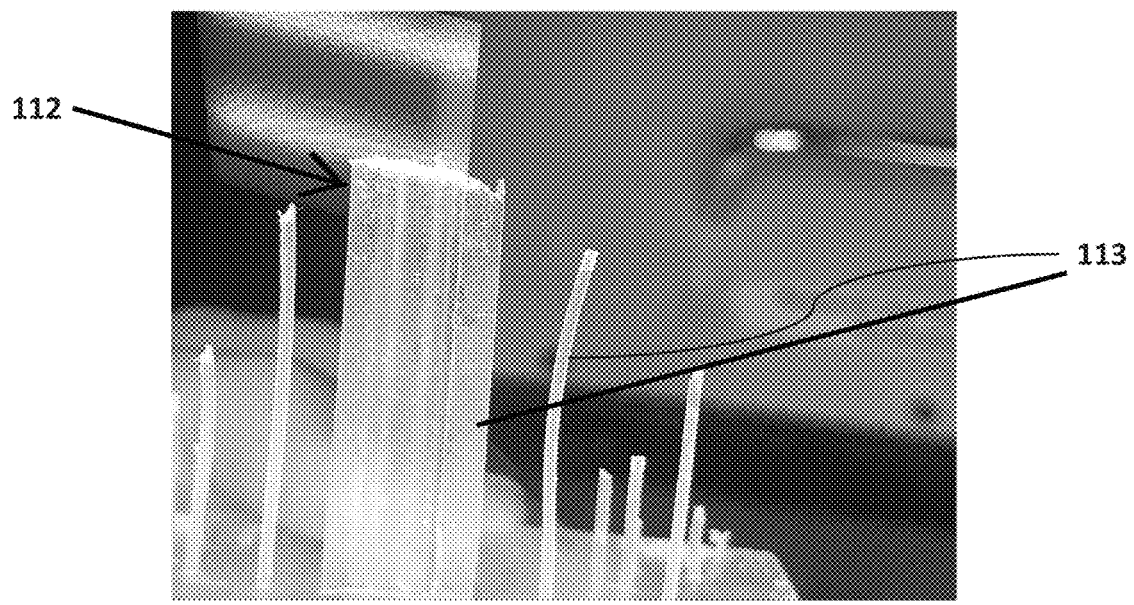
FIG. 9 shows the support of FIG. 7 separated from the dental appliance.

FIG. 9 illustrates the support 112 of the dental appliance precursor 100 separated from the appliance. As shown in FIG. 7 and FIG. 9, the support 112 of the dental appliance precursor 100 may comprise extensions 113 in order to print a local minimum of the appliance that lies below the adjacent portions of the appliance with reference to the direction of deposition.

Figure 10:
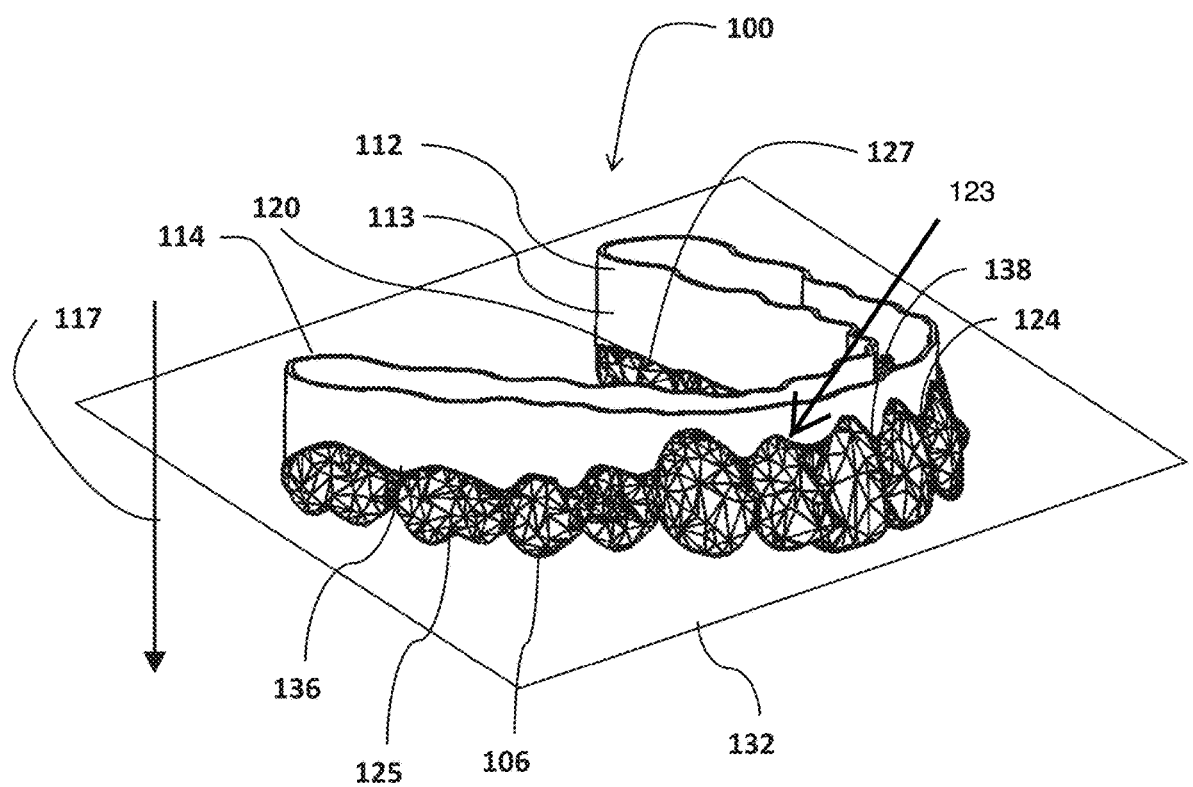
FIG. 10 shows a precursor to a dental appliance comprising an appliance coupled to a support with a direction of deposition extending in a gingival to occlusal direction, in accordance with some embodiments.

FIG. 10 illustrates an example of a completed dental appliance precursor 100 showing a dental appliance 106 coupled to a support 112 comprising one or more extensions 113. In this embodiment, the layers are printed in a gingival to occlusal direction of deposition 117, in which the layers of deposition extend approximately parallel to the occlusal plane 132 of the dental appliance 106. The layers of deposition can extend to within about +/−15 degrees of parallel to the occlusal plane, for example. In this example, the precursor 100 can be printed downward from the holder 114 with each successive layer being printed beneath the immediately preceding layer. The dental appliance comprises a buccal wall 125 and a lingual wall 127. An interior surface of the buccal wall 125 and the lingual wall 127 may form cavities for receiving a plurality of teeth. The support 112 comprises an extension 113 printed as a wall extending downward from the holder 114 to the buccal wall 125 and the lingual wall 127 of the dental appliance 106, such that each successive layer is printed below the immediately preceding layer, for example. A removal line 124 couples the support 112 to the dental appliance 106. The removal line 124 may comprise any of the removal lines as described herein. In some embodiments, a portion of the removal line 124 may remain after the support 112 is removed from the dental appliance precursor 100 to form a removal edge. The removal edge may extend at least partially between an interior side of the buccal wall and/or the lingual wall and an exterior side of the buccal wall and/or the lingual wall. The removal edge may traverse a plurality of layers of the dental appliance 106. The removal edge may protrude exteriorly from the dental appliance 106 with different distances relative to a layer line.

Figure 11:
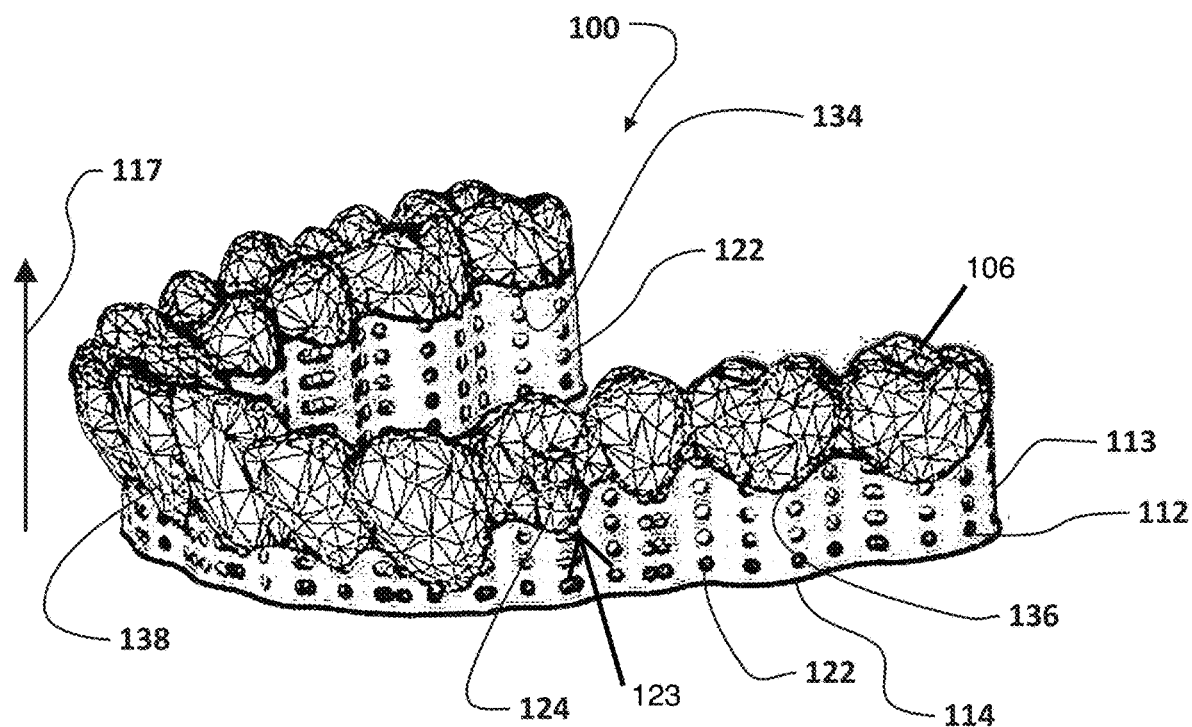
FIG. 11 shows a precursor to a dental appliance with a direction of deposition extending in a gingival to occlusal direction, in accordance with some embodiments.

FIG. 11 illustrates an example of a completed dental appliance precursor 100 similar to the example of FIG. 10. In the example of FIG. 11, the precursor 100 is printed upward from the holder 114 with each successive layer being printed on top of the immediately preceding layer. In this embodiment, the layers are printed in a gingival to occlusal direction of deposition 117, in which the layers of deposition extend approximately parallel to the occlusal plane 132 of the dental appliance 106. The layers of deposition can extend to within about +/−15 degrees of parallel to the occlusal plane, for example. Although reference is made to an angle within about +/−15 degrees of parallel to the occlusal plane, any suitable angle can be used to decrease local minima, e.g. minimize local minima, as described herein. Each layer may be printed in a plane that is generally parallel to an occlusal plane of the dental appliance 106. The support 112 comprises a wall that extends from the holder 114 to the dental appliance 106. The wall comprises one or more extensions 113 between the holder 114 and the appliance 106. The support includes a plurality of perforations 122 to reduce the amount of material used to print the support 112. The support 112 and the dental appliance 106 are coupled at a lingual edge 120, a buccal edge 136, and an anterior edge 138 of the dental appliance 106. A removal line 124 is formed between the support 112 and the dental appliance 106 and may, in some embodiments, occur at a gingival line of the dental appliance 106. Alternatively or in combination, removal line 124 can be located above the gingival line, for example located between the occlusal surface and the gingival line.

Figure 12:
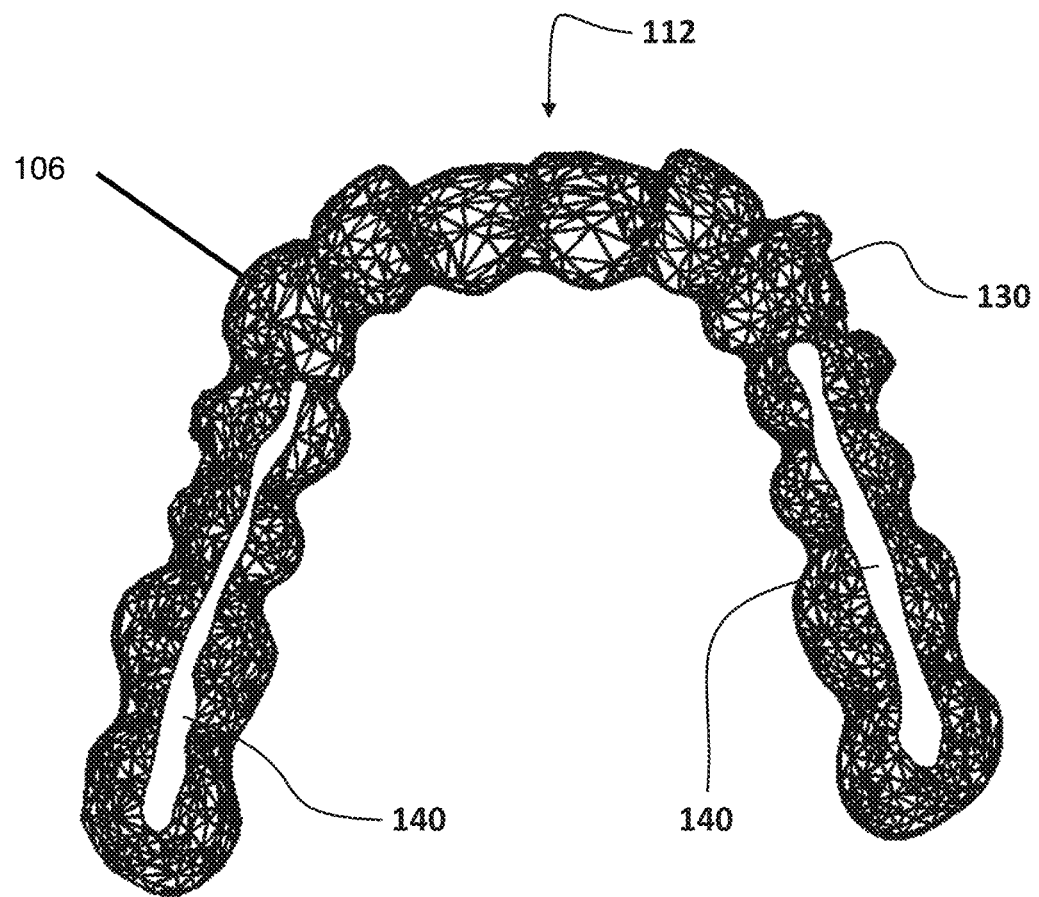
FIG. 12 shows a precursor to a dental appliance comprising voids in the occlusal surface, in accordance with some embodiments.

FIG. 12 illustrates a top view of the dental appliance 106 of FIG. 11 showing the occlusal surface 130 of the dental appliance 106. In some embodiments, the dental appliance 106 may comprise voids 140 where no material is printed. For example, voids 140 may exist in locations where the dental appliance 106 would extend below the surrounding area, e.g. a local minimum along the direction of additive layers. In order to decrease printing additional extension supports within the dental appliance, voids 140 may be provided in these areas to decrease post printing processing. For example, with some dental appliances, portions of the occlusal surface 130 may not significantly impact the performance of the appliance and may therefore be left unprinted.

Figure 13:
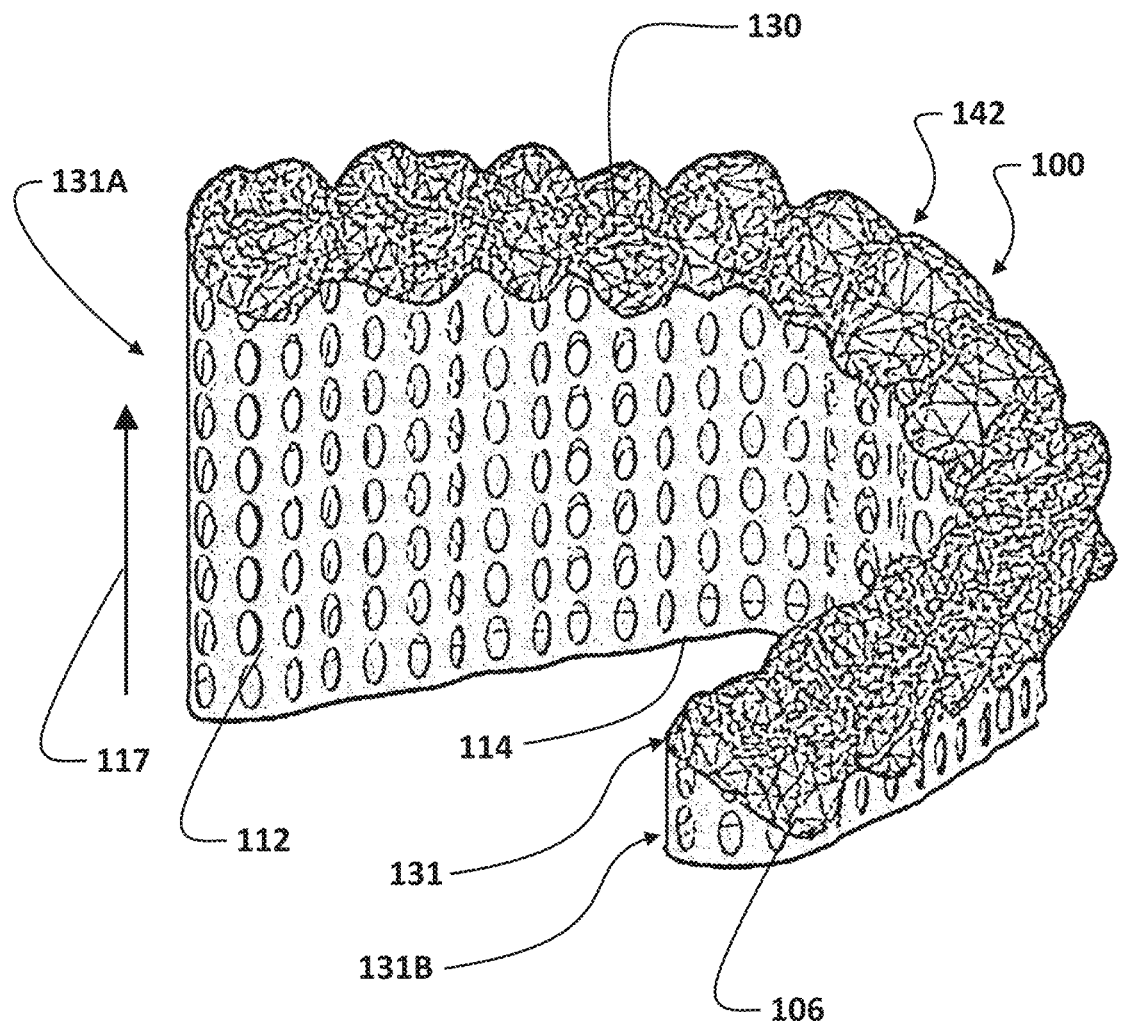
FIG. 13 shows a precursor to a dental appliance in which the layers are printed at an angle to the occlusal plane, in accordance with some embodiments.
Figure 14:
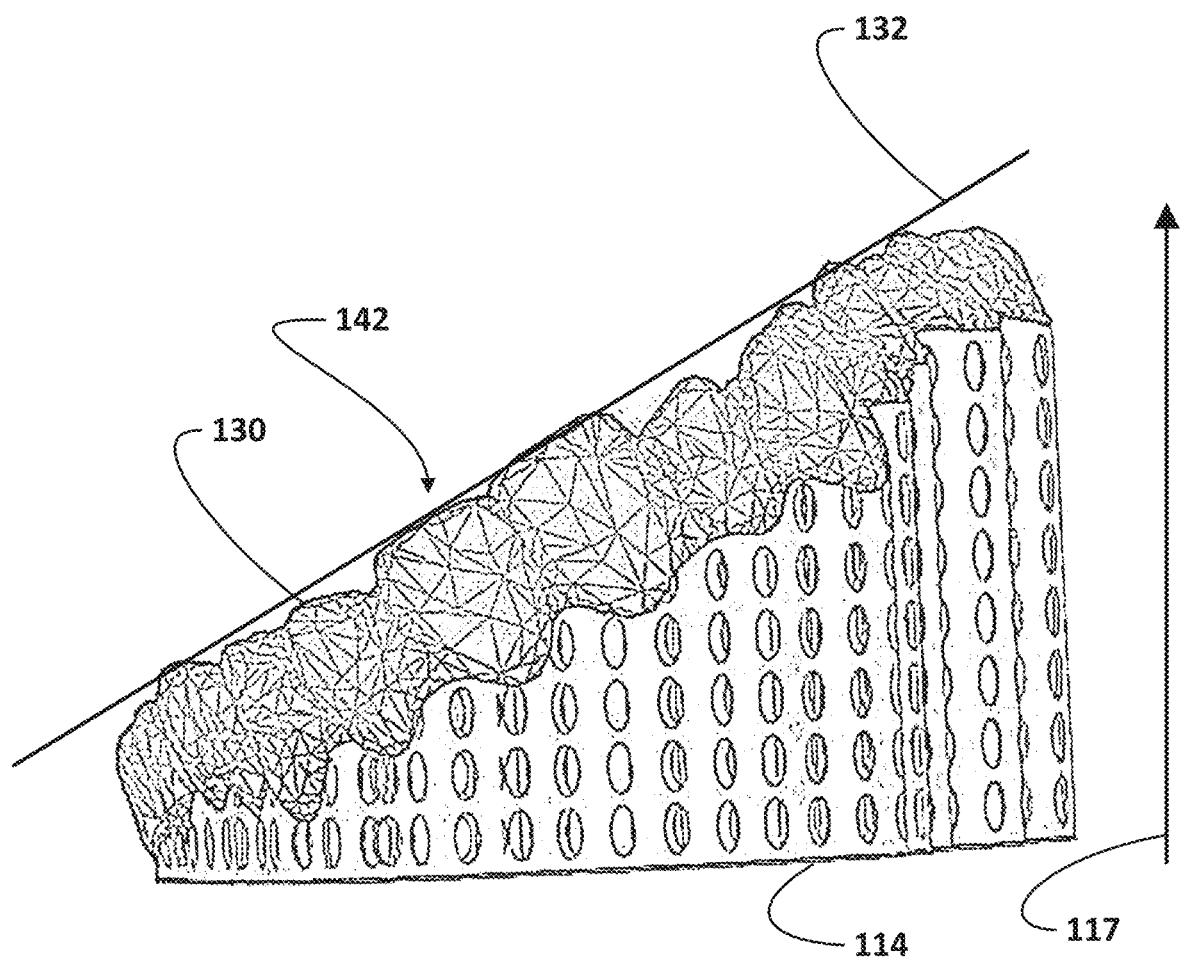
FIG. 14 illustrates an anterior view of the embodiment of a dental appliance precursor of FIG. 13 showing the angle between the direction of deposition and the occlusal plane.

FIG. 13 illustrates an embodiment of a dental appliance precursor 100 in which the deposition layers are printed at an angle relative to the occlusal plane 132. FIG. 14 illustrates an anterior view of the embodiment of the dental appliance precursor 100 of FIG. 13 showing the angle between the occlusal plane 132. The deposition layers extend approximately perpendicularly to the direction of deposition 117. In the embodiment of FIG. 13, the occlusal surface 130 at the anterior end 142 of the dental appliance 106 is at a different height relative to the holder 114 compared to a height of the occlusal surface 130 at the posterior end 131 relative to the holder 114. In some embodiments, the appliance can be inclined relative to the direction of deposition 117, such that a first posterior end 131a of the appliance is separated from the holder 114 with a first distance, and a second posterior end 131b is separated from the holder 114 with a second distance different from the first distance. The anterior end of the appliance can be separated from the holder 114 with a third distance between the first distance and the second distance. Inclining the occlusal plane 132 of the dental appliance 106 in relation to the deposition layers as described herein may reduce the number of local minima which may in turn reduce the number of extensions that are used. Inclining the appliance may also reduce the cross-sectional surface area where extensions contact the appliance along the removal edge. In some embodiments, the angle between the occlusal plane and the layers is from about 10 degrees to about 90 degrees. In some embodiments, the angle between the occlusal plane and the layers is from about 45 degrees to about 85 degrees. In still other embodiments, the angle between the occlusal plane and the layers is from about 50 degrees to about 80 degrees.

Figure 15:
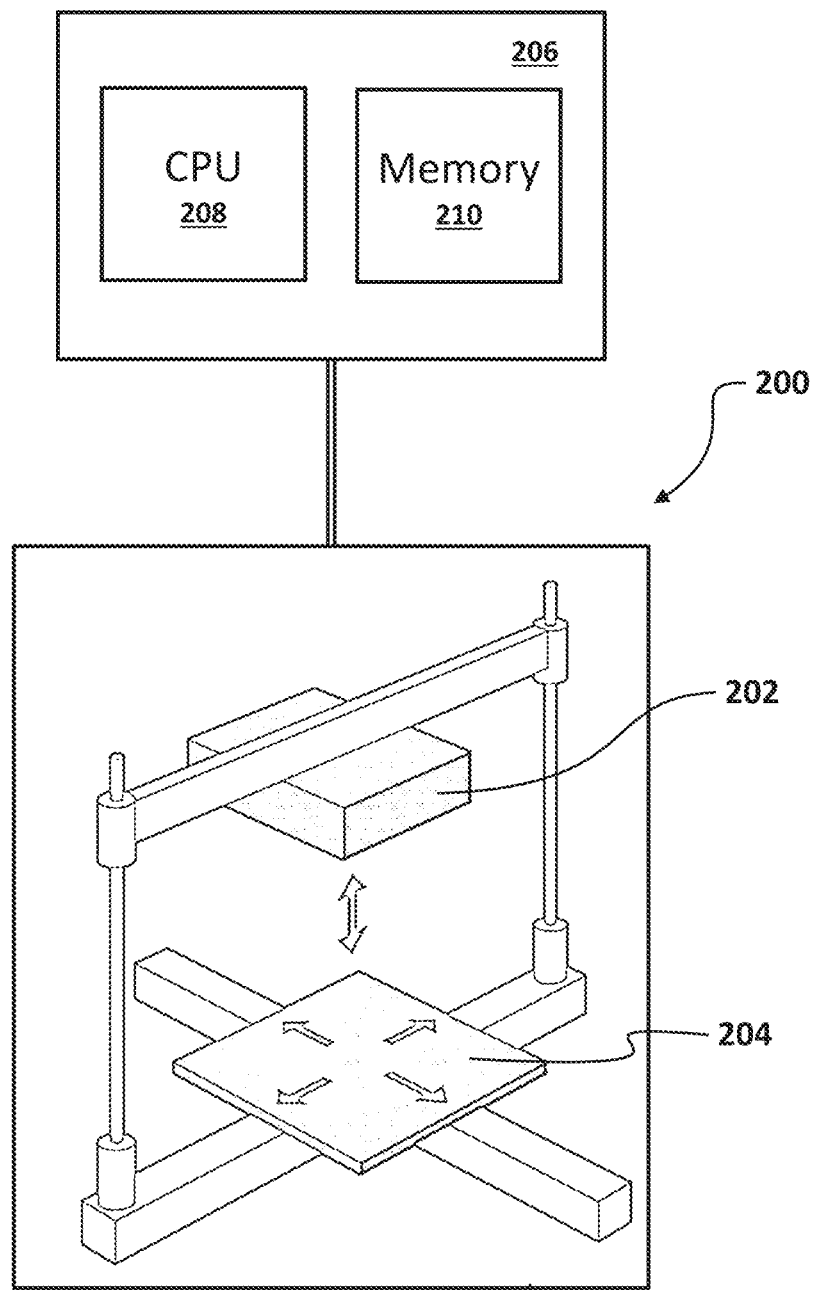
FIG. 15 shows a schematic of a 3D printer, in accordance with some embodiments.

FIG. 15 shows an example schematic of an additive manufacturing device, such as 3D printer 200. The 3D printer 200 comprises a print head 202 and a retaining surface 204. The 3D printer comprises a processor 206, which comprises a central processing unit (CPU) 208 and memory 210. The processor 206 can be configured with instructions to print the appliance as described herein. The instructions may comprise instructions to print each of the plurality of layers along a direction of deposition in order to form the precursor appliance as described herein. During the printing process the print head 202 prints each of the plurality of layers and the separation distance between the print head and the retainer 204 increases.

The 3D printer receives a digital data set corresponding to the shape and orientation of the appliance precursor in relation to the direction of deposition as described herein. While the digital data set can be configured in many ways, in some embodiments the digital data set defines one or more of voxels, contours, infills, hatching, or jump strategies, corresponding to the shape and orientation of the appliance in relation to the direction of deposition. The digital data set may correspond to a stage of treatment of the appliance. In some embodiments, the digital data set defines a plurality of appliances to be manufactured together on the retaining surface 204, in which each of the plurality of appliances corresponds to a different stage of treatment of the patient.

Although FIG. 15 shows the 3D printer 200 in a vertical orientation a print head 202 located above a retaining surface 204, other 3D printer types are suitable for use with the disclosed embodiments. For example, the print head 202 can be located beneath the retaining surface 204. In general, the 3D printing process prints a single planar layer at a time that is approximately parallel to the retaining surface 204. After printing a layer, the print head 202 may move away from the retaining surface 204 to print a new layer. Alternatively or in combination, the retaining surface 204 may move away from the print head 202. Each successive layer is built on the previous layer, for example on top of or beneath the previous layer. Although the 3D printer 200 is show in a vertical orientation, other orientations can be used to generate the appliance precursor 100 as described herein, for example horizontal or oblique orientations.

The additive manufacturing device may comprise one or more components as described in US 2017/0007359, entitled "Direct fabrication of orthodontic appliances with variable properties", published Jan. 12, 2017, the entire disclosure of which is incorporated herein by reference.

In some embodiments, a processor is configured with instructions for a user to design an appliance, identify and define features of the appliance and precursor. For example, a model of the precursor can be shown on a display, and the features of the appliance and support determined. Alternatively or in combination, some of these design steps can be automated. The additive manufacturing device may comprise one or more components as described in US 2017/0007359, such as the user interface, treatment planning software, user interface, scanner, and appliance materials described therein.

Figure 16:
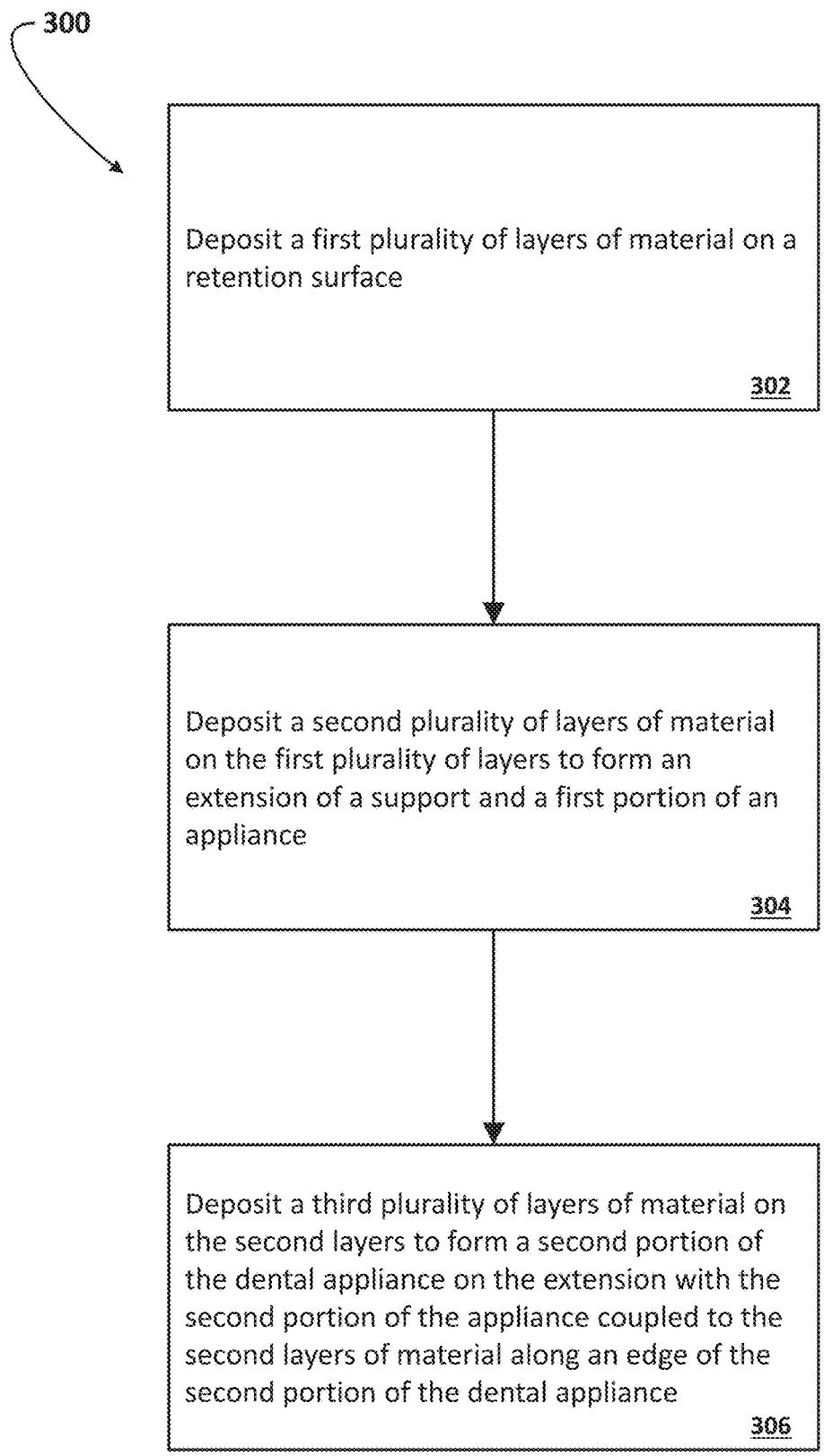
FIG. 16 shows a schematic of a method for manufacturing a dental appliance precursor, in accordance with some embodiments.

FIG. 16 shows a schematic of a method 300 for printing a dental appliance precursor in accordance with some embodiments. At step 302, a first plurality of layers of material is deposited on a retention surface. For example, in some embodiments 3D printer 200 may print a first layer of material or a plurality of layers on retaining surface 204. Additional layers of material are deposited on the first layer of material. There can be several layers of material deposited on the support prior to forming the appliance. For example, several layers can be deposited prior to forming the first plurality of layers of material may correspond to first plurality of layers 110 of FIG. 6.

At step 304, a second plurality of layers of material is deposited on the first plurality of layers to form an extension of a support and a first portion of a dental appliance. For example, in some embodiments 3D printer 200 may print a second plurality of layers on the first plurality of layers. The second plurality of layers may correspond to the second plurality of layers 111 of FIG. 6.

At step 306, a third plurality of layers are deposited on the second plurality of layers to form a second portion of the dental appliance on the extension of the support with the second portion of the appliance coupled to the second layers of material along an edge of the second portion of the dental appliance. For example, in some embodiments, 3D printer 200 may print a third plurality of layers of material to the second plurality of layers of material. The third plurality of layers may correspond to third plurality of layers 115 of FIG. 6.

Figure 17:
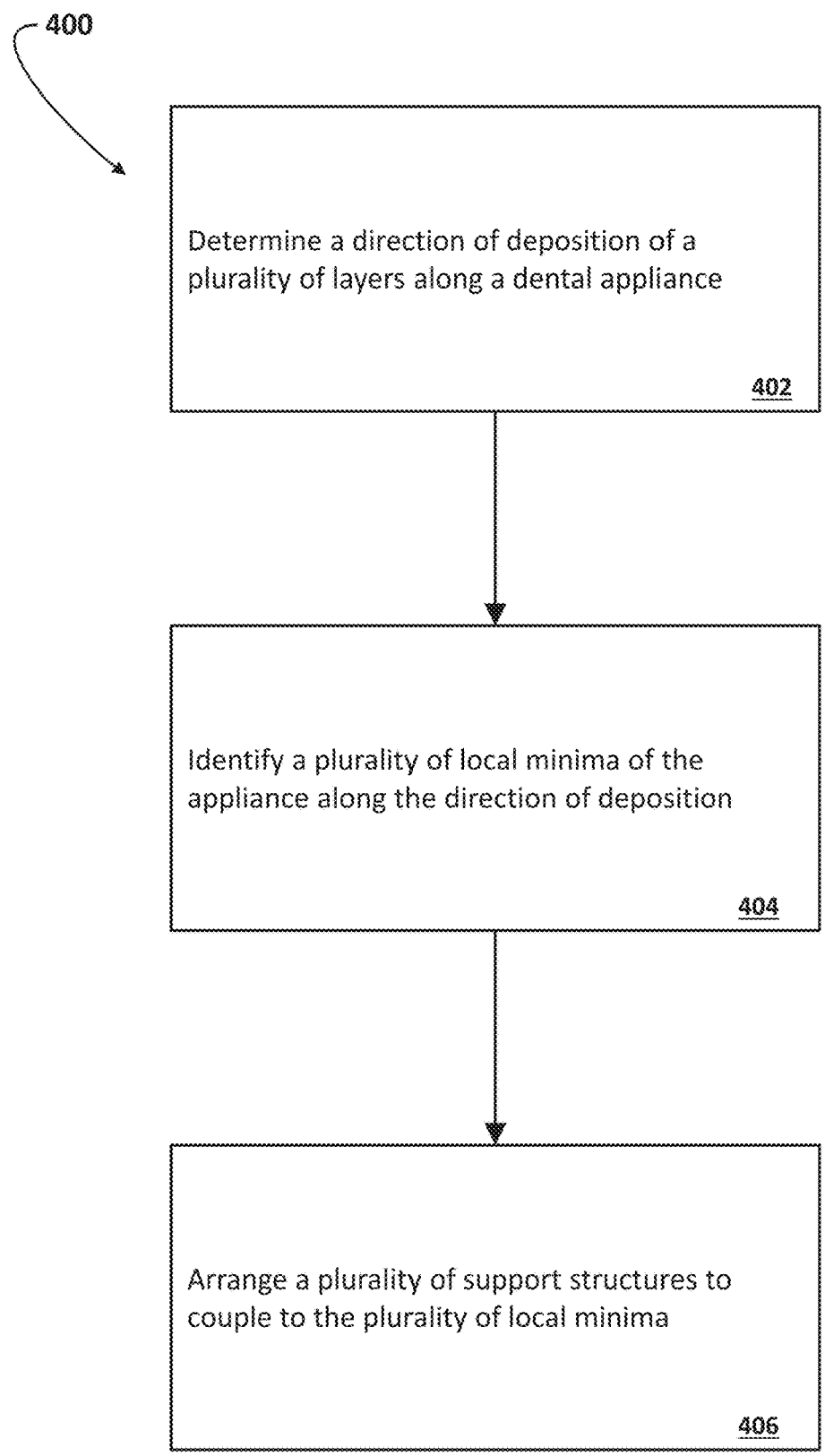
FIG. 17 shows a schematic of a method for manufacturing a dental appliance precursor, in accordance with some embodiments.

FIG. 17 shows a schematic of a method 400 for printing a plurality of supports. At step 402, a direction of deposition for a plurality of layers along a dental appliance is determined. For example, a computing device such as controller 206 or a separate computer, may determine a planar direction for printing a dental appliance such as dental appliance 106. At step 404, a plurality of local minima of the dental appliance along the direction of deposition is identified. For example, a computing device such as controller 206 or a separate computing device may identify a local minimum such as local minimum 128 of FIG. 2. At step 406, a plurality of support structures is arranged to couple the plurality of local minima. For example, a computing device such as controller 206 or a separate computing device may arrange to build a plurality of supports such as extensions 113 to couple the local minima to a base surface such as retaining surface 204.

In some embodiments, the support comprises a wall coupled to the holder and the appliance. The wall can be configured in many ways, and may comprise a variable thickness or a substantially uniform thickness, for example. In some embodiments, the wall comprises apertures, e.g. perforations, which can facilitate the removal of fluids, such as uncured material and cleaning fluids. The wall may comprise stiffness to add strength, which can facilitate removal of the precursor appliance from the build plate and handling of the precursor appliance after removal. In some embodiments, stiffeners extend between walls of the support to strengthen the walls. While stiffeners can be configured in many ways, in some embodiments, the stiffeners comprise one or more of struts or trusses extending between the walls of the support to add strength. In some embodiments, the stiffeners are arranged in a generally triangular pattern to provide strength to the walls. In some embodiments, two internal stiffeners extend between the walls of the support to define two legs of a triangle, and the portion of the wall extending between the two stiffeners define a third leg of the triangle.

In some embodiments, the internal stiffeners can be viewed through one or more of the apertures. Although reference is made to internal stiffeners, in some embodiments stiffeners such as trusses can be fabricated exterior to the walls.

In some embodiments, the walls can facilitate the detection of warpage, which can be helpful during quality control procedures of the precursor and the appliance. Also, the support comprising walls connected with internal stiffeners may allow removal of the precursor appliance more quickly from the build plate, which can decrease the manufacturing time in some instances.

In some embodiments, the support comprises walls. Work in relation to the present disclosure suggests that walls coupled to each other with stiffeners can allow the walls to be thinner, which can decrease the amount of material used. One of ordinary skill in the art can conduct simulations such as finite element analysis to determine the appropriate thickness of the wall and configuration of the internal trusses.

In some embodiments, an overall angle of inclination of the appliance in relation to a build platform is determined as described herein, and the shape profile and structure of the support and walls determined in response to the angle of inclination. In some embodiments, the appliance is supported with the walls along an edge of the appliance as described herein. The appliance can be removed from the support and finished, for example by removing the support, surfacing finishing and maintaining mechanical and aesthetic integrity of the 3D printed appliance.

The appliance can be removed from the support in many ways as described herein, such as laser trimming along the edge of the appliance, which can decrease reliance on finishing the surface of the appliance. Although reference is made to laser trimming, in some embodiments, the appliance is coupled to the walled support along a removal edge comprising a weakened portion as described herein, so as to facilitation removal.

In some embodiments, the walled support comprises internal channels to facilitate removal uncured liquid resin or other fluid to drain or flow away from the walled support and appliance supported thereon. The channels may be configured to work with the overall structure and the direction of intended flow of the material being removed during post processing.

Work in relation to the present disclosure suggests that the walled support with internal stiffeners may improve print accuracy, which may be related to the strength of the walled support.

Figure 18A:
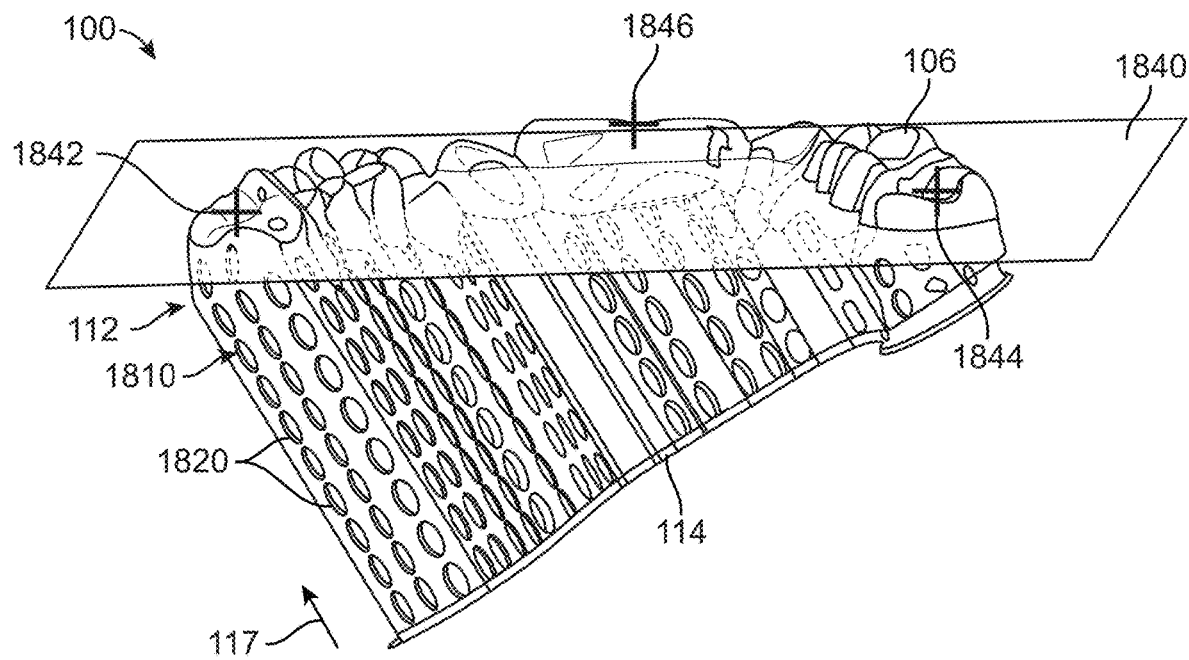
FIG. 18A shows an appliance precursor comprising a walled support suitable for the incorporation internal stiffeners, in accordance with some embodiments.

FIG. 18A shows an appliance precursor 100, in which the support 112 comprises a wall 1810 coupled to the holder 114 as described herein. The wall 1810 comprises a plurality of apertures 1820 to allow fluid to drain from an interior of the wall 1810. While the wall can be formed in many ways, in some embodiments the wall supports the appliance on a lingual side of the appliance and a buccal side of the appliance 106. The appliance 106 can be supported along a removal edge as described herein, so as to decrease additional manufacturing steps as described herein. The precursor appliance 100 can be manufactured in a direction of deposition 117 extending from holder 114 to appliance 106. In some embodiments, a plan 1840 defines a cross-section through the appliance precursor 100. A plurality of reference locations along the plane are shown, including first location 1842, a second location 1844 and third location 1846.

Figure 18B:
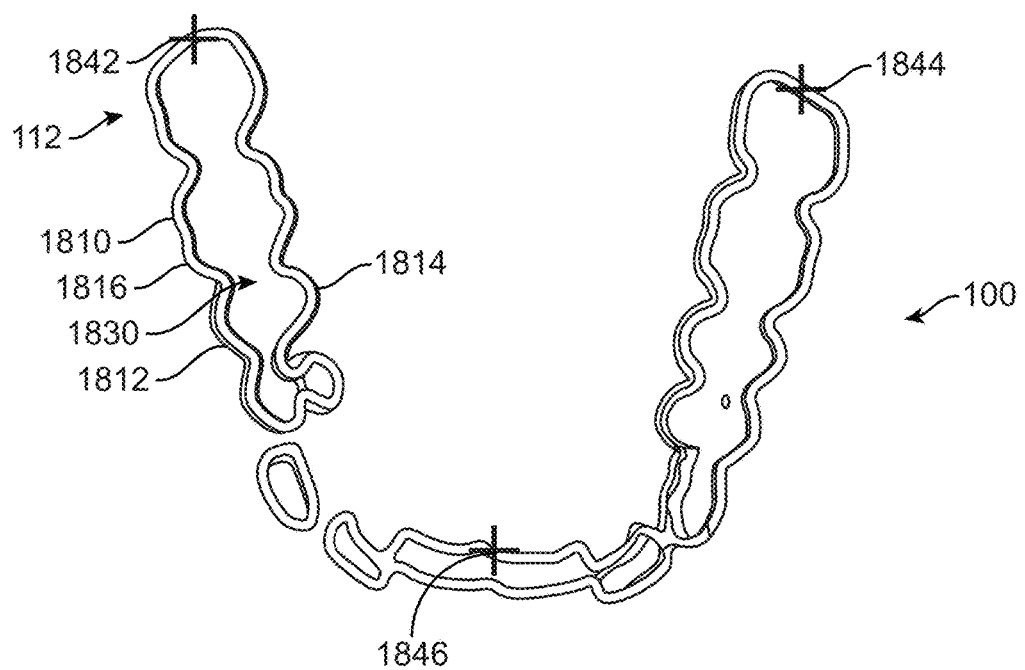
FIG. 18B shows a cross-sectional view of the appliance precursor of FIG. 18A showing a cross-sectional view of the walled support suitable for internal stiffeners.

FIG. 18B shows a cross-sectional view of the appliance precursor of FIG. 18A showing a cross-sectional view of the walled support along the plane 1840. The plane 1840 extends through the precursor appliance 100 and defines a cross-sectional profile 1816 of the precursor appliance 100 and extends through a portion of the wall 1810. The wall 1810 of the support 112 comprises a buccal wall 1812 and a lingual wall 1814, which define an interior 1830 of the support located between the two walls. In some embodiments, the interior 1830 comprises stiffeners extending between the two walls. In some embodiments, the plurality of apertures 1820 extend through the buccal wall 1812 and the lingual wall 1814 so as to allow fluid removal from the interior 1830.

The cross-sectional profile 1816 can be configured in many ways. In some embodiments, the cross-sectional profile 1816 corresponds to a profile of appliance 106, such as an edge profile corresponding to a removal line as described herein. In some embodiments, the walls extend with cross-sectional profile 1816 between the holder 114 and appliance 106. The buccal wall 1812 and the lingual wall 1814 extend along the direction of deposition 117, and the walls can be manufactured with the deposition of layers as described herein. In some embodiments, the cross-sectional profile 1816 of the walls near holder 114 corresponds to the removal profile of the appliance 106, such that the buccal wall 1812 and the lingual wall 1814 extend in a substantially straight path along the direction of deposition 117. Alternatively or in combination, the walls and profile 1816 can vary, and may comprise other shapes other than substantially straight, such as with columns, external bracing or other structures to add support.

Figure 19:
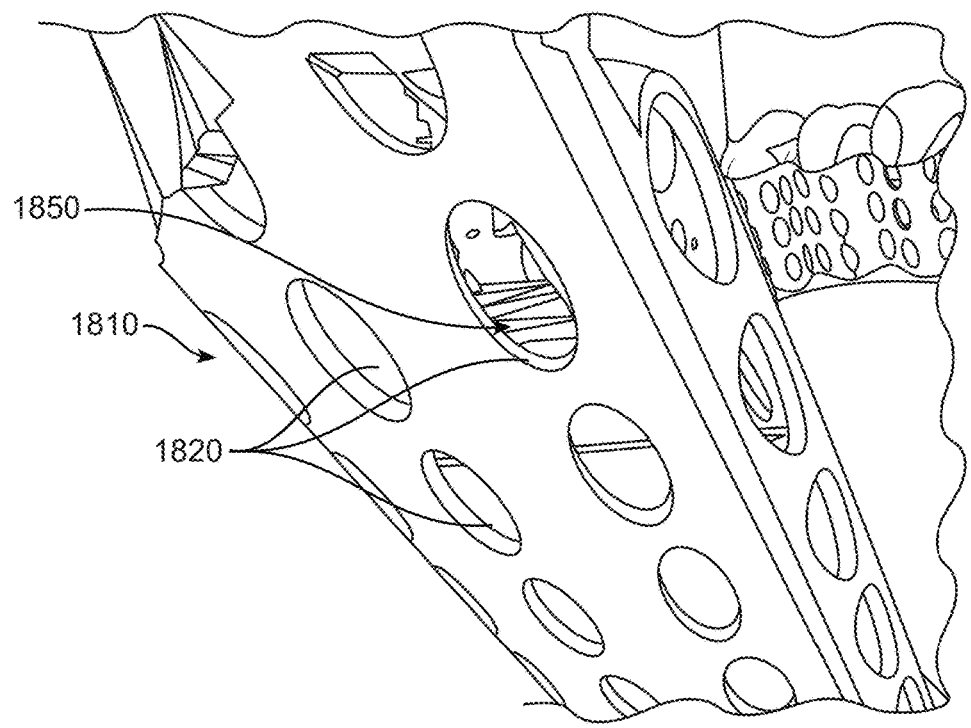
FIG. 19 shows a view of internal stiffeners through an aperture of a walled support of an appliance precursor as in FIGS. 18A and 18B.

FIG. 19 shows a view of internal stiffeners 1850 through one or more apertures 1820 of a walled support of an appliance precursor as in FIGS. 18A and 18B. In some embodiments, the internal stiffeners 1850 are visible through the plurality of apertures, which can facilitate manufacturing and allow quality control procedures with respect to the stiffeners of support 112. The internal stiffeners 1850 can be configured with any suitable shapes and orientations relative to one or more of the appliance or the direction of deposition, and may comprise one or more of struts, trusses, rods, bars, bracing, or mesh. Alternatively or in combination, the internal stiffeners may comprise a completely filled-in interior of the wall along at least a portion of the interior, and in some embodiments the interior is completely filled-in to add stiffness.

Figure 20:
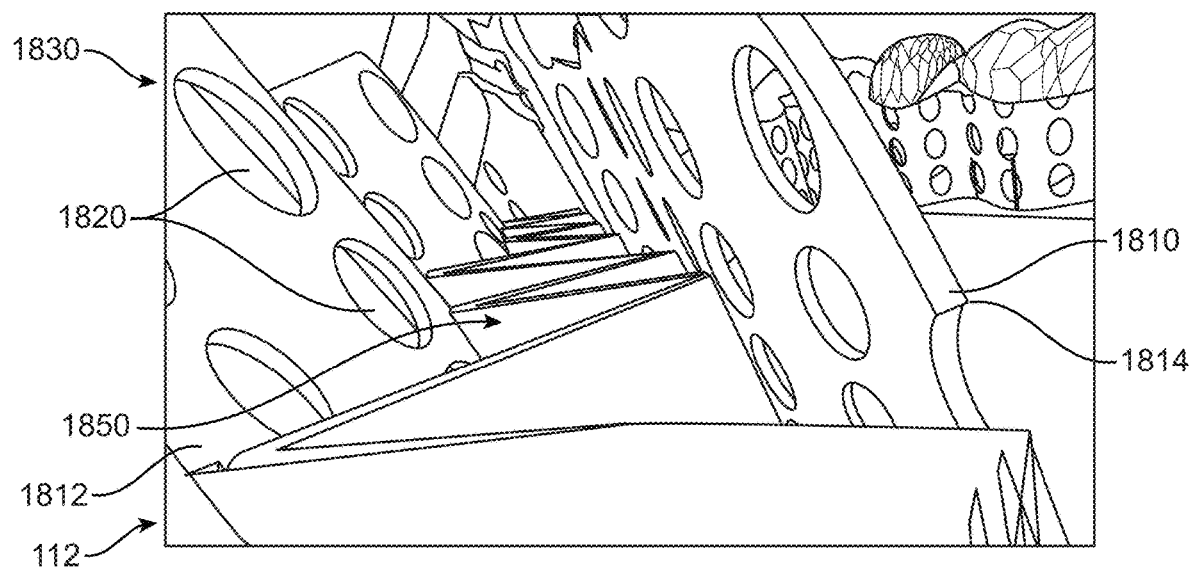
FIG. 20 shows an internal view of stiffeners as in FIG. 19 extending along an interior of the walled support.

FIG. 20 shows an internal view of stiffeners 1850 as in FIG. 19 extending along the interior 1830 of the walled support 112 between the buccal wall 1812 and the lingual wall 1814.

Figure 21:
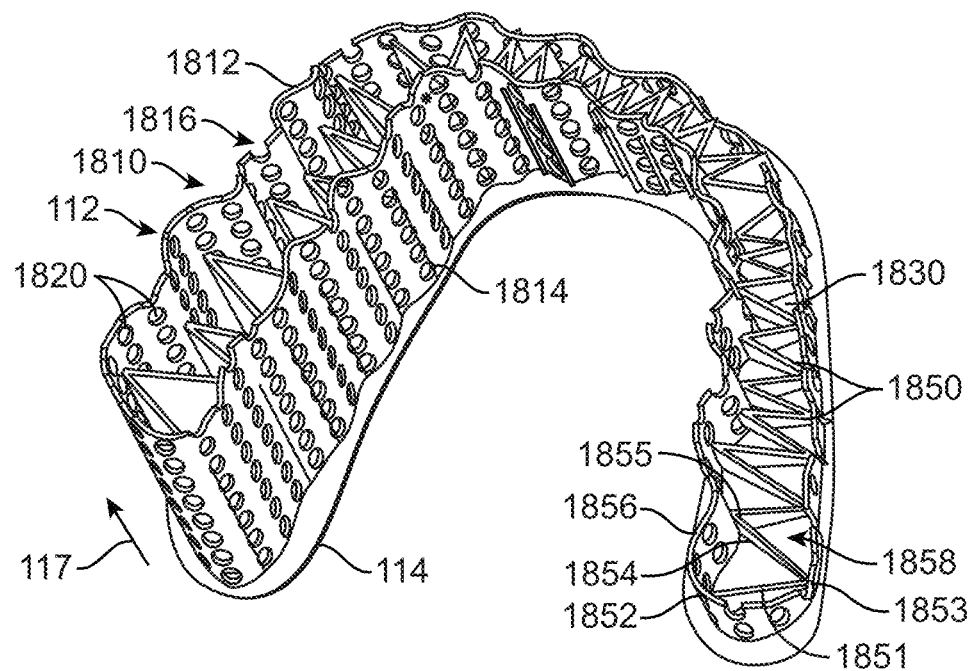
FIG. 21 shows another view of internal stiffeners as in FIG. 20.

FIG. 21 shows another view of internal stiffeners 1850 as in FIG. 20. The internal stiffeners 1810 extending between buccal wall 1812 and lingual wall 1814 can be arranged in many ways. In some embodiments, each of the plurality of stiffeners extends from a first location on a first wall to a second location on a second wall. The relative positions of the first location and the second location can be arranged in many ways. For example, the first location and the second location may correspond to a shortest distance between the buccal wall 1812 and the lingual wall 1814. Alternatively or in combination, the plurality of stiffeners can be inclined relative to each other. Work in relation to the present disclosure suggests that inclining the stiffeners relative to each other can add stiffness and strength to the walls of the support. In some embodiments, two stiffeners couple to a first wall at first locations separated by a first distance and couple to a second wall at second locations separated by a second distance greater than the first distance. The amount by which the second distance is greater than the first distance can be related to an angle of inclination between the two stiffeners.

In some embodiments, the plurality of stiffeners is arranged so as to define a generally triangular arrangement 1858 of the plurality of stiffeners 1850. In some embodiments, a first stiffener 1851 extends from a first location 1852 on a first wall to a second location 1853 on a second wall, and a second stiffener 1854 extends from the second location 1853 on the second wall to a third location 1855 on the first wall. A portion 1856 of the first wall extends between the first location and the third location, so as to define a generally triangular arrangement of the plurality of stiffeners. The distance between the first location and the third location is related to the angle of inclination between the first stiffener and the second stiffener. In some embodiments, the second location 1853 corresponds to an apex of a triangle, the first stiffener 1851 and the second stiffener 1854 correspond to first and second legs of the triangle coupled to the apex at the second location 1853, and the portion 1856 of the wall 1810 extending between the first location 1852 and the third location 1855 corresponds to a third leg of a triangle. Although reference is made to the plurality of stiffeners extending in a triangular arrangement, the stiffeners can be arranged in many ways to add strength to the walls of the support as described herein.

Figure 22:
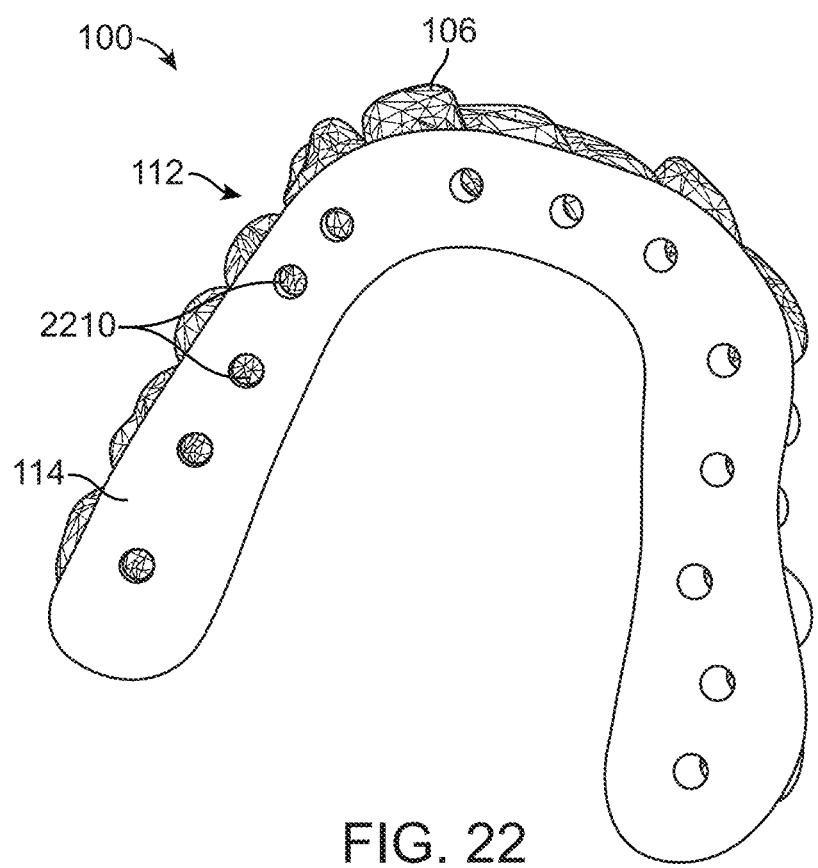
FIG. 22 shows holes in a holder of a precursor appliance support to allow fluid to drain from a precursor appliance, in accordance with some embodiments.

FIG. 22 shows holes 2210 in a holder 114 of a support 112 of a precursor appliance 100 to allow fluid to drain from a precursor appliance 100. The precursor appliance 100 may comprise an aligner 100 and support 112 as described herein. In some embodiments, the support 112 comprises walls as described herein. The holes 2210 can facilitate drainage from an interior of the support as described herein, and can be helpful during cleaning and other processing of the appliance precursor 100.

Although reference is made to precursor appliances comprising an appliance supported along an edge of the appliance, in some embodiments the appliance is supported on an occlusal surface of the appliance. Supporting the appliance along the occlusal surface can leave the teeth receiving cavities substantially open, so as to facilitate access to the teeth receiving cavities for removal of fluids such as residual resin and for cleaning of the appliance. In some embodiments, supporting the appliance along the occlusal surface can also eliminate the potential defects on the edge of the appliance that may occur during the removal of the supports along the edge, so as to reduce the requirement of the successive polishing process. The appliance precursor comprising supports, e.g. extensions, coupled to the occlusal surface can decrease warpage as compared with prior approaches, for example during curing of the appliance precursor.

The support may comprise extensions as described coupled to the occlusal surface to support the appliance. The extensions can be arranged in many ways to decrease the formation of printing islands, for example by supporting the occlusal surface with the extensions at local minima as described herein.

Work in relation to the present disclosure suggest that supporting the appliance along the occlusal surface can decrease the time to deposit material. In some embodiments, the appliance is oriented with respect to the direction of fabrication so as to reduce deposition time by reducing the deposition height. For example, an occlusal plane of the appliance as described herein can be oriented to within about 15 degrees of perpendicular to the direction of fabrication, so as to decrease an overall height of the appliance precursor.

Work in relation suggests that supporting the appliance along the occlusal surface can decrease over curing along the internal tooth receiving cavities and improve the accuracy of the shape of the internal tooth receiving cavities, which can be related to improved fitting of the appliance on teeth.

In some embodiments, supports, are coupled to the appliance to decrease warpage, such as warpage related to curing after the appliance precursor has been fabricated. In some embodiments, the supports comprise sufficient strength to decrease warpage by coupling to an exterior surface of the appliance, and the support can be configured in many ways and may comprise extensions and braces coupled to the appliance. The supports coupled to the appliance can be configured to provide regions with openings and gaps and to facilitate the removal of fluids and cleaning. In some embodiments, the appliance is coupled to the support with sufficient strength to allow manufacturing steps, such as the removal of fluid and clearing. In some embodiments, the stiffness of the supports can be appropriately configured by increasing volume of the supports, being cured separately, or with intensity curing. This approach can provide supports that are less likely to warp than the appliance and maintain the aligner in shape as designed.

Figure 23A:
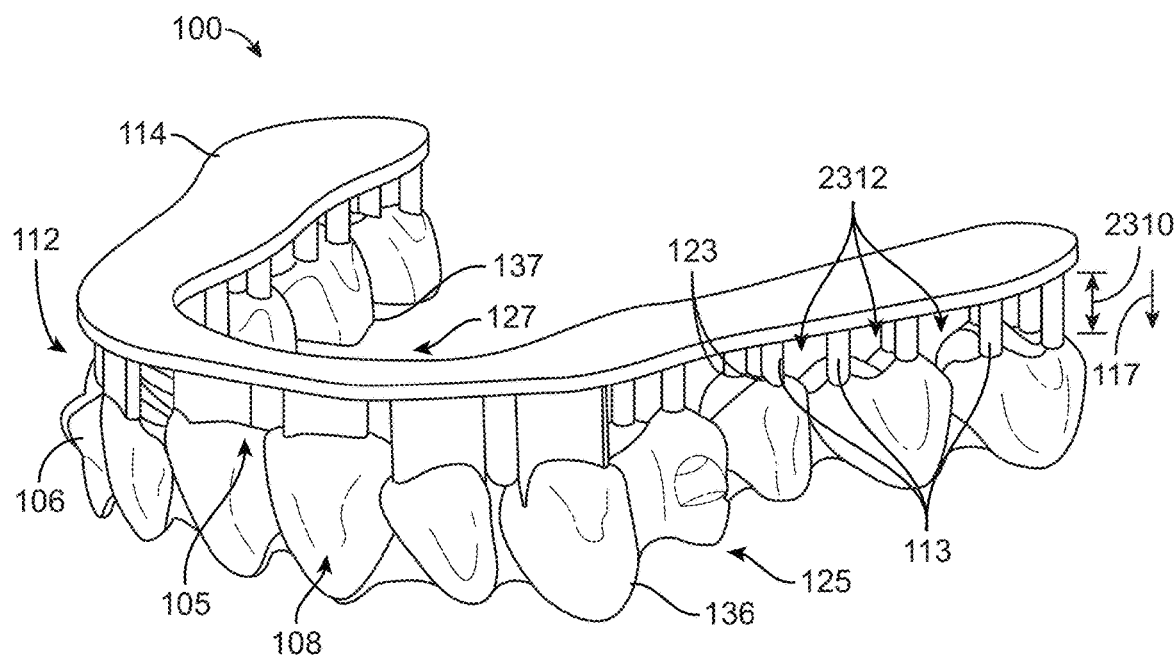
FIG. 23A shows an appliance precursor comprising a support coupled to an occlusal surface of the appliance.
Figure 23B:
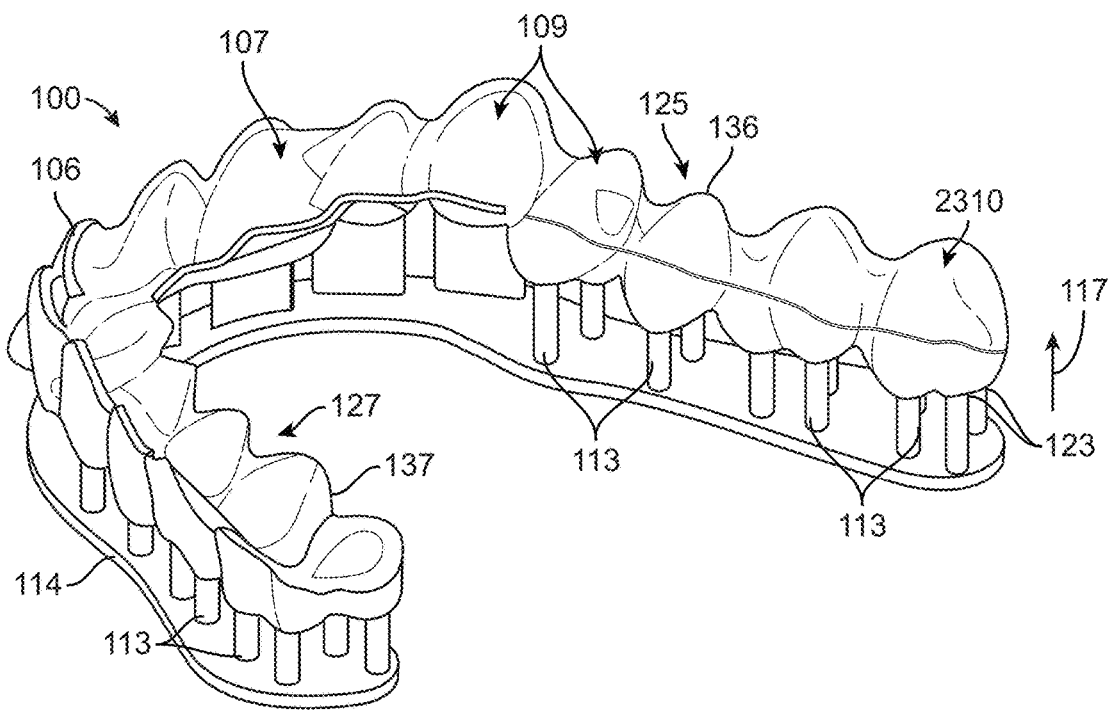
FIG. 23B shows the appliance precursor of FIG. 23A in a different orientation.

FIG. 23A shows an appliance precursor 100 comprising a support 112 coupled to an occlusal surface 105 located of the appliance 106. FIG. 23B shows the appliance precursor 100 of FIG. 23A in a different orientation. The appliance precursor 100 can be manufactured with the direction of deposition 117, which indicates the direction in which layers of material are added to form the appliance precursor. In some embodiments, the appliance 106 comprises an interior surface 107 and an exterior surface 108 defining the plurality of teeth receiving cavities 109.

In some embodiments, the occlusal surface 105 comprises a surface contour corresponding to a contour of the plurality of teeth receiving cavities. In some embodiments, the interior surface 107 of the appliance 106 is shaped to correspond to an occlusal surfaces of the tooth, and the occlusal surface 105 of the appliance comprises a shape corresponding to the interior surface 107. This can result in the occlusal surface 105 of the appliance comprising structure related to the occlusal surfaces of the teeth, such as local minima as described herein.

The support 112 can be configured to couple to the appliance 106 in many ways. In some embodiments, support 112 comprises a holder 114 and a plurality of extensions 113 extending from the holder 114 to the occlusal surface 105. The holder 114 can facilitate handling and processing of the appliance precursor 100, for example while the holder retains the precursor 100 on the build plate or subsequent to removal from the build plate. The holder can be formed by depositing layers on a build plate of an additive manufacturing apparatus such as a 3D printer. The plurality of extensions 113 and appliance 106 can be formed with deposition of layers along the direction of deposition 117.

In some embodiments, the appliance 106 comprises a buccal wall 125 and lingual wall 127 extending from the occlusal surface 105. The buccal 125 wall may extend to a gingivally facing buccal edge 136. The lingual wall 127 may extend to a gingivally facing lingual edge 137. In some embodiments, the appliance 106 comprises a plurality of teeth receiving cavities 109. In some embodiments, the buccal wall 125 and lingual wall 127 are formed with deposition of layers along the direction of deposition 117 so as to define the tooth receiving cavities 109.

The plurality of extensions 113 can extend between the holder 114 and the occlusal surface 105 of the appliance, so as to provide a gap 2310 between the holder and the occlusal surface 105. The plurality of extensions 113 can be separated to as to provide gaps between the plurality of extensions, the holder 114 and the occlusal surface 105, so as to define openings 2312 between the plurality of extensions, the holder 114 and the occlusal surface 105. These openings 2312 can facilitate removal of material, cleaning, polishing and additional manufacturing steps.

While the plurality of extensions 113 can be coupled to the occlusal surface 105 in many ways, in some embodiments a plurality of extensions is coupled to the occlusal surface at a plurality of locations corresponding to a tooth receiving cavity, such as a single tooth receiving cavity 2312. The plurality of extensions 113 can be coupled to the occlusal surface at a plurality of locations corresponding to local minima of the occlusal surface along the direction of fabrication. Any suitable number of extensions can be coupled to the occlusal surface corresponding to a single tooth, such as one, two, three, or four extensions, and these extensions can be coupled to the occlusal surface at any suitable number of locations.

In some embodiments, the plurality of extensions 113 comprise weakened portions 123 as described herein to facilitate removal of the extensions from the occlusal surface.

In some embodiments, the direction of fabrication extends from an occlusal surface of the appliance to an interior surface of the appliance so as to decrease over curing of material along the interior surface. In some embodiments, the interior surface 107 may be subjected to less extensive curing than the occlusal surface 105. In some embodiments, a light beam is directed to the appliance from an orientation such that the light beam can impinge directly on the interior surface 107 without passing through the occlusal surface 105 prior to impingement on the interior surface 107, which can improve the accuracy of the interior surface 107. In some embodiments, because a portion of the light beam illuminating the interior surface 107 may reach and pass through the occlusal surface 105, excess material on occlusal surface can be cured while the interior surface 107 is cured as expected. Although reference is made to the excess curing of material on the occlusal surface, in some embodiments, the illumination to the occlusal surface can be decreased when the occlusal surface is formed, so that the total amount of illumination and curing to the occlusal surface corresponds to the intended amount after the interior surface 107 has been illuminated and formed.

With additive manufacturing devices such as 3D printers, a light beam can be directed to cure material such as resin to shape the appliance. The light beam can be configured to generate a layer of the appliance along a plane as described herein. Once the layer has been cured, the build plate can then move the layer away from light beam for the light beam to cure another layer of material. As the build plate moves and the light beam defines successive layer, the direction of deposition 117 is defined.

In some embodiments, the appliance precursor comprises side supports such as side supports coupled to the appliance near a gingivally facing portion of the appliance. In some embodiments, an array of supports such as extensions, connect to the exterior of a gingivally facing portion of the appliance. In some embodiments, the support comprises one or more walls coupled to the sidewalls of the appliance with a plurality of extensions. In some embodiments, the sidewalls of the support comprise apertures such as slots. The apertures can decrease suction force when the holder is removed from the build plate, and can allow fluids to drain from an interior of the support walls and facilitate cleaning, for example.

Work in relation to the present disclosure suggests that directly fabricated appliances may be susceptible to warping near the side walls of the appliance, and the side supports, such as extensions, as disclosed herein can be configured to decrease warpage. In some embodiments, the plurality of extensions comprises sufficient stiffness to decrease warpage related to a distance between the buccal wall and the lingual wall. In some embodiments, a first plurality of extensions is coupled to the buccal wall at a first plurality of locations and a second plurality of extensions is coupled to the lingual wall at a second plurality of locations.

Figure 24A:
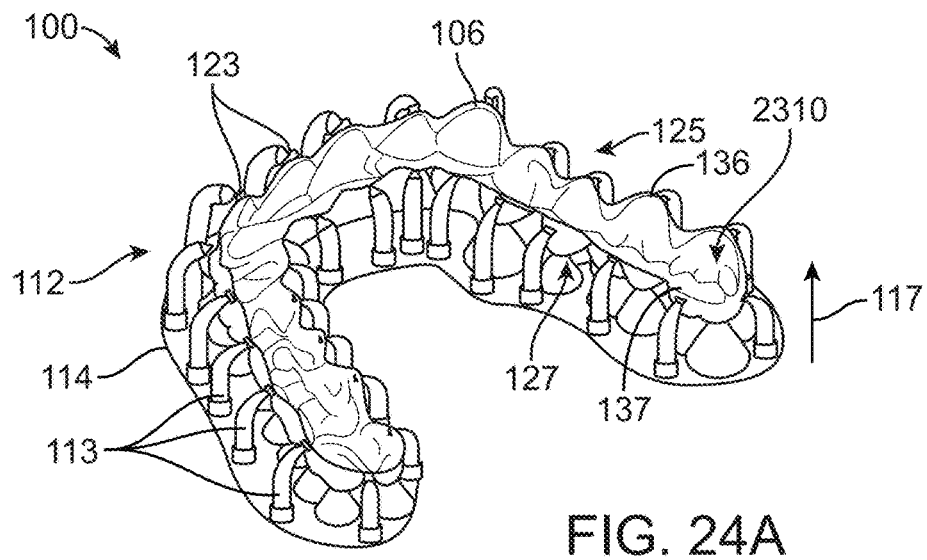
FIG. 24A shows an appliance precursor with side supports coupled to a wall of the appliance, in accordance with some embodiments.

FIG. 24A shows an appliance precursor 100 with side supports coupled to a one or more walls of the appliance 106. The walls of the appliance 106 may comprise one or more of a buccal wall 125 or a lingual wall 127. The buccal wall 125 may extend to a gingivally facing buccal edge 136. The lingual wall 127 may extend to a gingivally facing lingual edge 137. In some embodiments, these edges face toward the gingiva when the appliance is placed on the teeth. The side supports may comprise a plurality of extensions 113 extending from the holder 114 to the walls of the appliance. In some embodiments, the plurality of extensions 113 is coupled to the walls of the appliance at a plurality of locations near the gingivally facing edges, for example within about 1 mm of the gingivally facing edges of the appliance. In some embodiments, the plurality of extensions 113 couples to the walls of the appliance at a plurality of locations along the gingivally facing edges of the appliance, such as at a plurality of locations along the buccal edge 136 and a plurality of locations along the lingual edge 137. The plurality of extensions 113 may comprise a plurality of weakened portions 123 to facilitate removal of the plurality of extensions from the appliance as described herein. In some embodiments a first plurality of extensions coupled to the buccal wall comprises a first plurality of weakened regions and a second plurality extensions is coupled to the lingual wall comprises a second plurality of weakened regions.

Figure 24B:
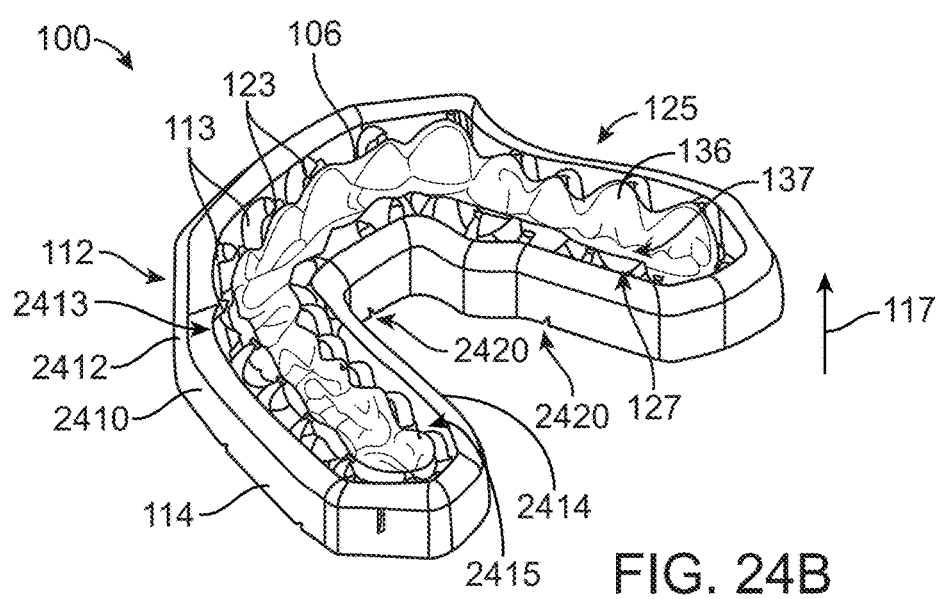
FIG. 24B shows an appliance precursor with side supports coupled to a wall of the appliance and apertures to reduce suction force when the precursor is separated from a build plate, in accordance with some embodiments.

FIG. 24B shows an appliance precursor 100 with side supports coupled to a wall 2410 of the appliance and apertures 2420. In some embodiments, the wall 2410 is thickened to prevent the appliance 106 from warping under cleaning conditions, such as extreme cleaning conditions. The wall can be topologically optimized to reduce material consumption while maintaining stiffness. The apertures 2420 can be configured to reduce suction force when the precursor is separated from a build plate, or to drain fluid from the wall 2410 and facilitate cleaning, for example. In some embodiments, the support 112 comprises holder 114, wall 2410, and plurality of extensions 113 coupled to the appliance 106. In some embodiments the plurality of extensions 113 extend from the wall 2410 to the one or more of the buccal wall 125 or the lingual wall 127 of the appliance 106.

In some embodiments, the wall 2410 of the support 112 comprises a buccal wall 2412 coupled to the buccal wall 125 of the appliance 106. In some embodiments, the plurality of extensions 113 couples to the buccal wall 125 at a plurality of locations near the edge 136 of the buccal wall, for example within 1 mm of the edge or along the edge as described herein.

In some embodiments, the wall 2410 of the support 112 comprises a lingual wall 2414 coupled to the lingual wall 127 of the appliance 106. In some embodiments, the plurality of extensions 113 couples to the lingual wall 127 at a plurality of locations near the edge 137 of the lingual wall, for example within 1 mm of the edge or along the edge as described herein. In some embodiments, a gap extends between the wall of the support and the one or more of the buccal wall or the lingual wall of the appliance and wherein the plurality of extensions extends across the gap. In some embodiments, the gap comprises a gap 2413 extending between the buccal wall 2412 of the support 112 and the buccal wall 125 of the appliance. In some embodiments, the gap comprises a gap 2415 extending between the lingual wall 2414 of the support 112 and the lingual wall 127 of the appliance.

The plurality of extensions 113 may comprise a plurality of weakened portions 123 as described herein to facilitate removal of the appliance from the extensions. In some embodiments a first plurality of extensions coupled to the buccal wall comprises a first plurality of weakened regions and a second plurality extensions is coupled to the lingual wall comprises a second plurality of weakened regions.

Figure 24C:
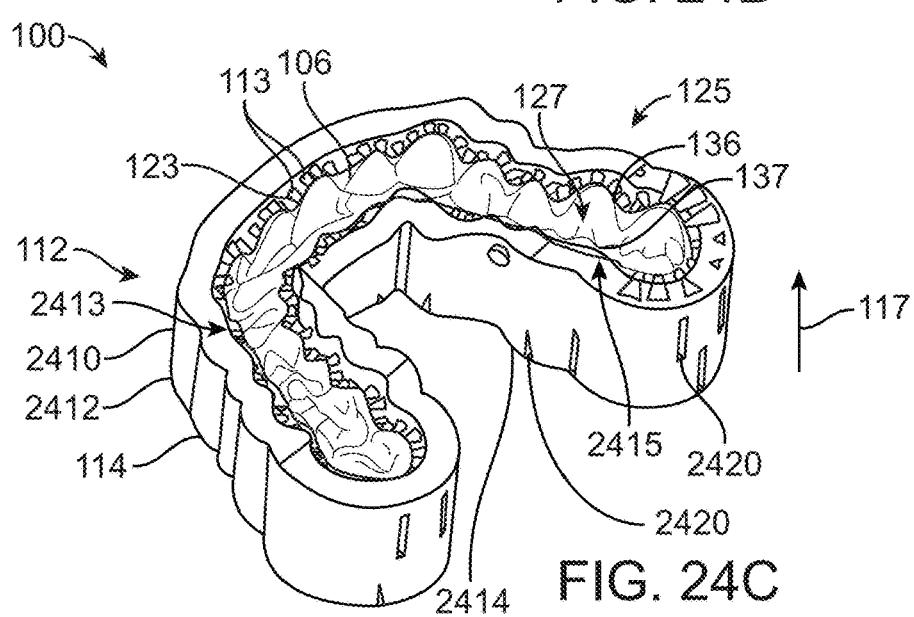
FIG. 24C shows an appliance precursor with side supports coupled to a wall of an appliance, in which the appliance support comprises a side wall and the side supports extend between the wall of appliance and the wall of the support, in accordance with some embodiments.

FIG. 24C shows an appliance precursor 100 with side supports coupled to a wall of an appliance, in which the appliance support comprises a side wall 2410 and the side supports extend between the wall of appliance and the wall of the support. In some embodiments, the wall 2410 is thickened to prevent the appliance 106 from warping under cleaning conditions, such as extreme cleaning conditions. The wall can be topologically optimized to reduce material consumption while maintaining the stiffness. The appliance precursor 100 shown in FIG. 24C comprises structures similar to the structures described with reference to FIG. 24B.

The wall 2410 of the support 112 may comprise an interior extending between the buccal wall 2412 and the lingual wall 2414. The interior of the wall 2410 can be configured in many ways, and may comprises internal stiffeners as described herein.

Referring again to FIGS. 24A to 24C, in some embodiments, a first plurality of extensions 113 is coupled to the sides of the appliance along with a second plurality of extensions 113 coupled to the occlusal surface of the appliance with openings and gaps as described herein, for example with reference to FIGS. 23A and 23B.

Alternative or additional support structures can be coupled to the appliance to decrease warpage of the appliance. In some embodiments, a cage is coupled to the appliance to decrease warpage.

Figure 25A:
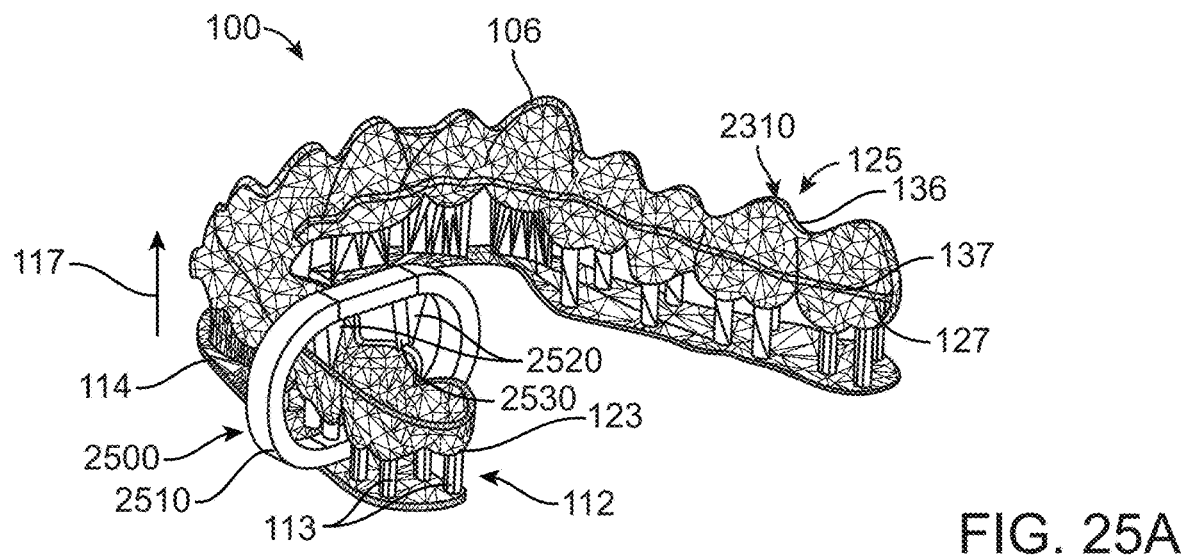
FIG. 25A shows an appliance precursor with a cage extending around a portion of the appliance to support walls of the appliance, in accordance with some embodiments.

FIG. 25A shows an appliance precursor 100 with a cage 2500 extending around a portion of the appliance to support walls of the appliance. FIG. 25C shows a cross-sectional view of an appliance precursor comprising a cage as in FIG. 25A. FIG. 25D shows a cross-sectional end view of the appliance precursor comprising a cages as in FIGS. 25A and 25C.

In some embodiments, the cage comprises a band 2510 and a plurality of extensions 2520. The band extends at least partially around a portion of the appliance 106. The plurality of extensions 2520 extends from the band 2510 to the to the appliance 106 to couple to the appliance at a plurality of locations. The plurality of extensions 2520 can be configured to couple to the appliance at any suitable location. In some embodiments, the extensions 2520 couple to a portion 2530 of the appliance around which the cage extends. In some embodiments, the band 2510 extends completely around the portion of the appliance, e.g. 360 degrees, and the portion 2530 of the appliance extends through the band. In some embodiments, the plurality of extensions extends to the portion 136 of the appliance extending through the band. The band 2510 can be configured in many ways, and may generally comprises a support structure extending at least partially around the appliance 106.

The band 2510 may comprise any suitable cross-sectional thickness, cross sectional width, and strength. In some embodiments, the band comprises a perimeter corresponding to one or more of a C-shape, an oblong shape, an oval shape, triangle, a polygon, a rectangle, or a square.

In some embodiments, the plurality of extensions 2520 couples to the walls of the appliance near one or more gingivally facing edges of the appliance as decreased herein. The extensions 2520 may comprise one or more regions comprising weakened portions as described herein.

Figure 25B:
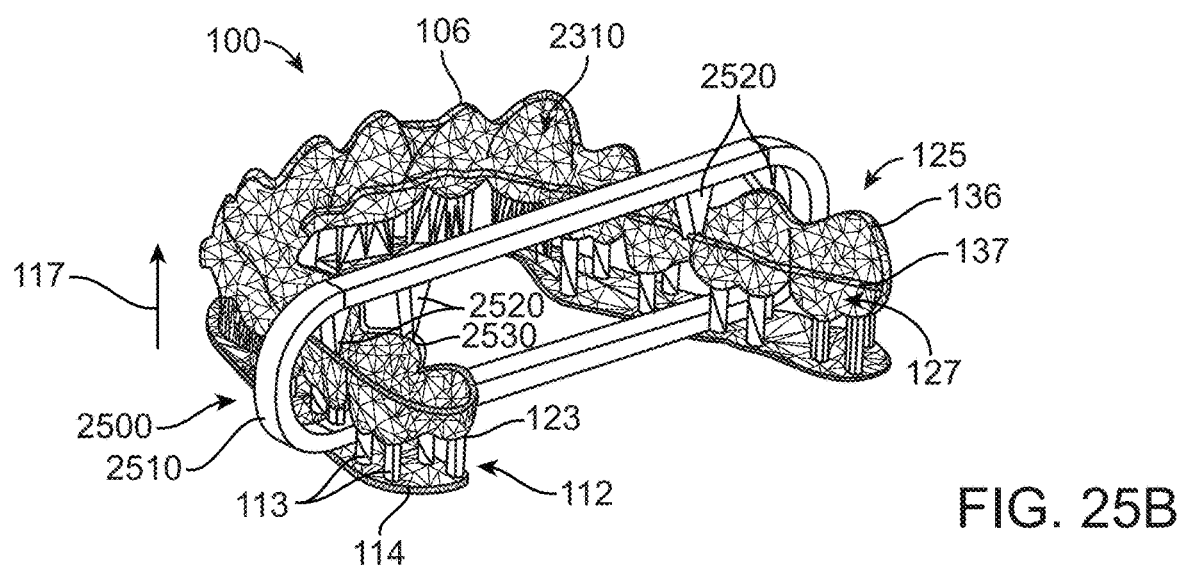
FIG. 25B shows an appliance precursor comprising a cage coupled to an appliance around sections of the appliance corresponding to opposite sides of a mouth of a patient, in accordance with some embodiments.
Figure 25C:
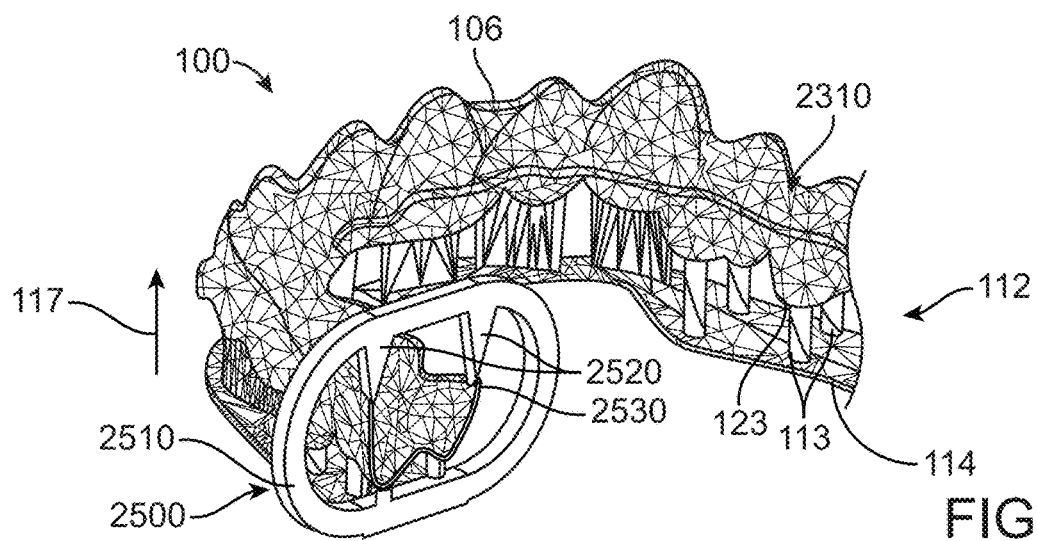
FIG. 25C shows a cross-sectional view of an appliance precursor in FIG. 25A.
Figure 25D:
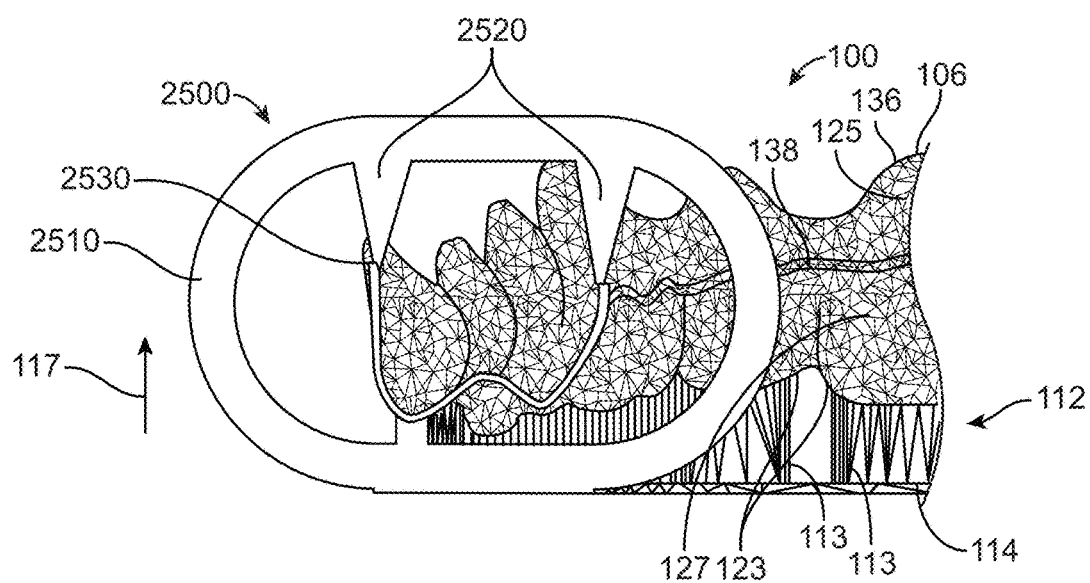
FIG. 25D shows a cross-sectional end view of the appliance precursor as in FIGS. 25A and 25C.

FIG. 25B shows an appliance precursor 100 comprising a cage 2500 coupled to an appliance 106 around a plurality of sections of the appliance corresponding to opposite sides of a mouth of a patient. In some embodiments, the band 2510 extends around both of the sections corresponding to opposite sides of the mouth. A first plurality of extensions 2520 extends from band 2510 to a first portion of the appliance corresponding to a first side of the mouth, and a second plurality of extensions 2520 extends from the band 2510 to a second portion of the appliance corresponding to a second side of the mouth.

Figure 25E:
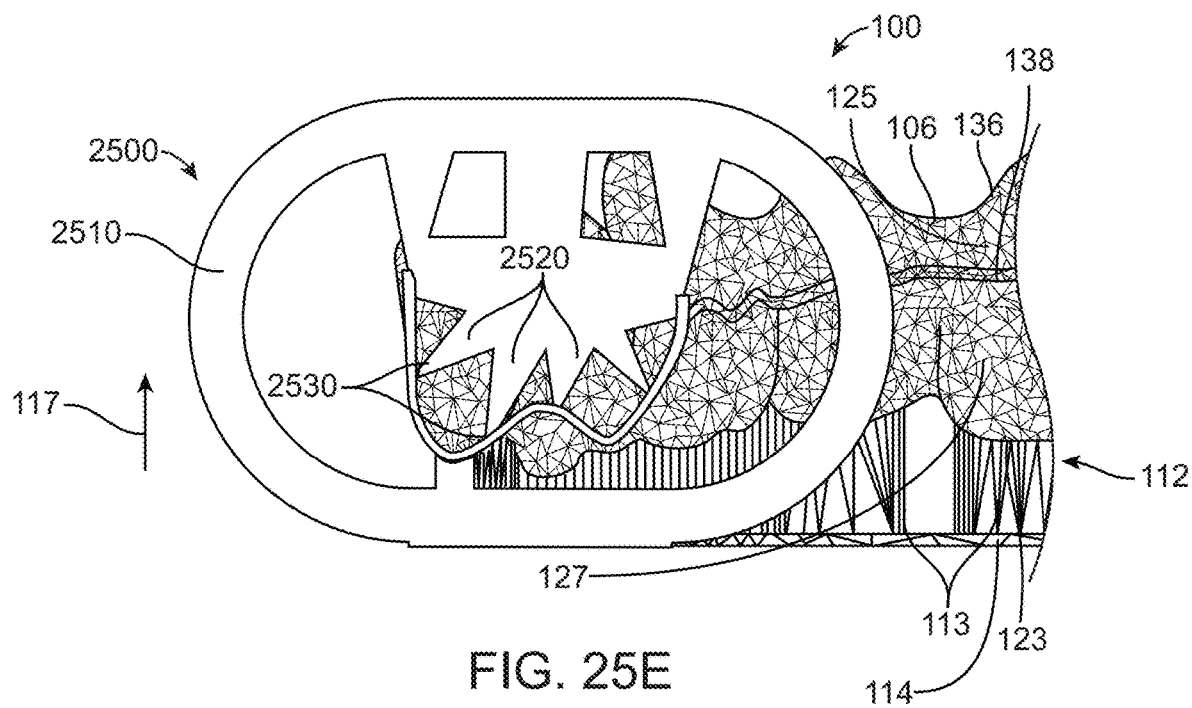
FIG. 25E shows a cross-sectional view of an appliance precursor comprising cage extending around a portion of an appliance and coupling to an interior of the appliance, in accordance with some embodiments.

FIG. 25E shows a cross-sectional view of an appliance precursor 100 comprising cage 2500 extending around a portion of an appliance 100 and coupling to an interior of the appliance with a plurality of extensions 2520. In some embodiments, the plurality of extensions couples to the appliance along an interior of the appliance. The interior of the appliance 106 comprises a tooth facing surface of the appliance as described herein. The structure extending to the interior of the appliance can improve handling of the appliance for additional manufacturing steps.

In some embodiments, the plurality of extensions 2520 is coupled to local minima on the interior of the appliance, for example when the appliance is support on one or more edges as described herein.

The cage 2500 can be configured to facilitate removal from the appliance. The band 2510 of the cage 2510 can be located a sufficient distance from the appliance to serve as a handle or grasping structure to remove the band. The plurality of extensions 2520 may comprise regions with weakened portions as described herein to facilitate removal.

The embodiments of FIGS. 25A to 25E may comprise one or more of the features described with respect to 23A to 23B, and description of like elements with like reference numbers has not be repeated.

The cages 2500 described with reference to FIGS. 25A to 25E are well suited for use with different directions of deposition and orientations, for example with reference to edge supported embodiments as disclosed herein.

Figure 26A:
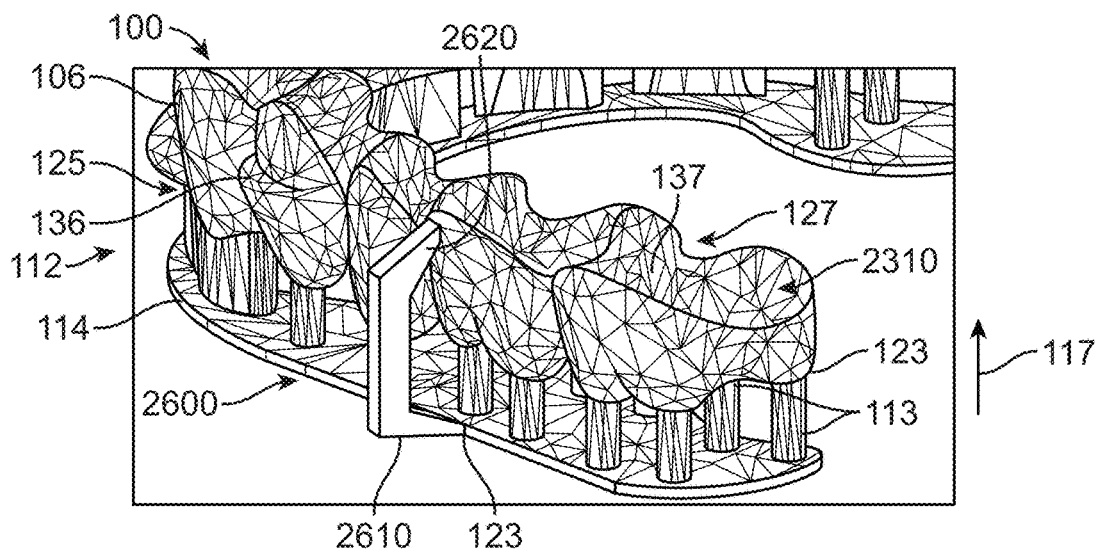
FIG. 26A shows an appliance precursor comprising a brace extending from an appliance holder to a wall of an appliance near a gingivally facing edge of the appliance.

FIG. 26A shows an appliance precursor 100 comprising a brace 2600 extending from a holder 114 to a wall of an appliance 106 near a gingivally facing edge of the appliance. The gingivally facing edge may comprise a buccal edge 136 or a lingual edge 137, for example. The brace 2600 can be coupled to near the edge, for example within 1 mm of the edge, or along the edge as described herein. The brace 2600 may comprise first extension 2610 coupled to the holder 114 and a second extension 2620 coupled to the appliance wall near the edge. In some embodiments, the first extension 2610 extends away from the appliance wall and the second extension 2620 extends away from the holder to define a handle shaped portion to facilitate remove of the brace 2600. In some embodiments, the first extension 2610 comprises weakened portion as described herein to facilitate removal from the holder 114 and the second portion 2620 comprises a weakened portion as described herein to facilitate removal of the brace from the appliance.

Figure 26B:
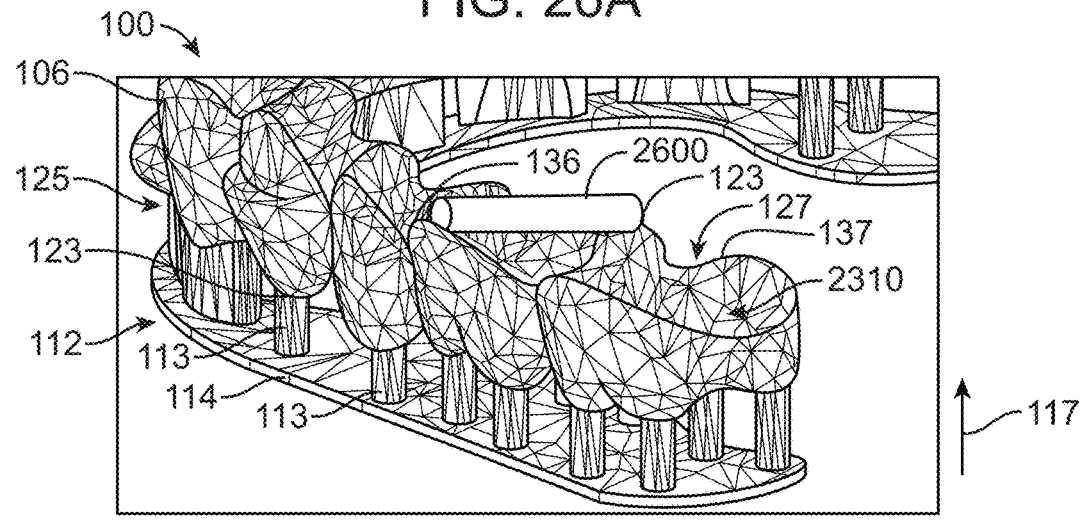
FIG. 26B shows an appliance precursor comprising a brace extending between a lingual wall of an appliance and a buccal wall of the appliance.

FIG. 26B shows an appliance precursor 100 comprising a brace 2600 extending between a buccal wall 125 of an appliance and a lingual wall 127 of the appliance. In some embodiments, the brace 2600 is coupled to the buccal wall 125 near a gingivally facing buccal edge 136 and to a lingual wall 127 near a buccal edge 136, for example within 1 mm of each of the edges or along each of the edges.

Figure 26C:
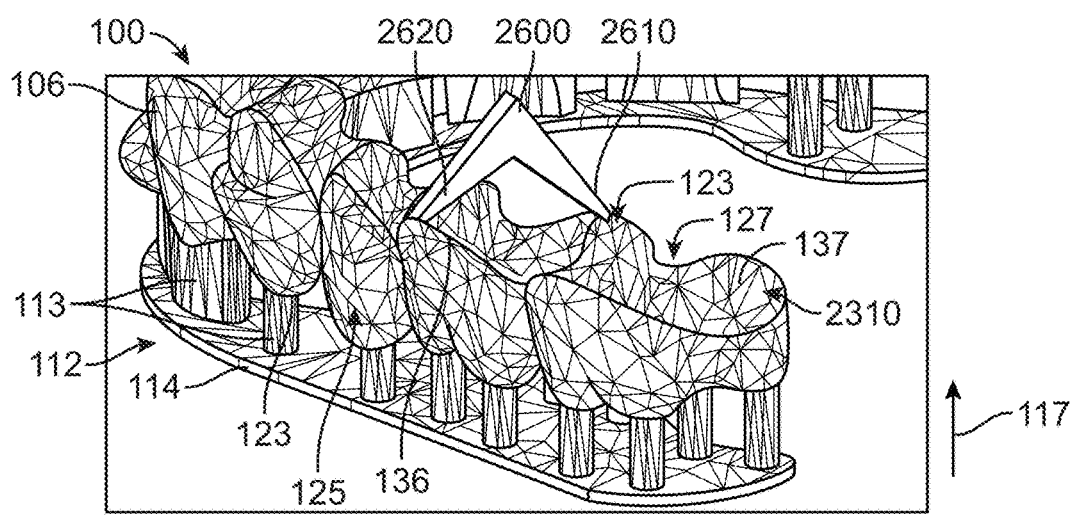
FIG. 26C shows an appliance precursor comprising a brace extending between a lingual wall of an appliance and a buccal wall of an appliance with a portion of the brace extending away from the appliance to facilitate removal, in accordance with some embodiments.

FIG. 26C shows an appliance precursor 100 comprising a brace 2600 extending between a buccal wall 125 of an appliance 106 and a lingual wall 127 of the appliance with a portion of the brace extending away from the edges of the appliance to facilitate removal. In some embodiments a first extension 2610 is coupled to the lingual wall and a second extension 2620 is coupled to the lingual wall, and the first extension and the second extension are inclined relative to each other to a so define a handle portion to facilitate removal.

The first extension 2610 may comprise a weakened portion near first edge of a first wall as described herein and the second portion 2620 may comprise a weakened portion near a second edge of a second wall as described herein to facilitate removal.

The embodiments of FIGS. 26A to 26C may comprise one or more of the features described with respect to 23A to 23B.

Although the brace 2600 has been described with reference to an appliance 106 supported on an occlusal surface, the brace 2600 can be used with other embodiments, for example with edge supported appliances with different fabrication directions as described herein.

Figure 27:
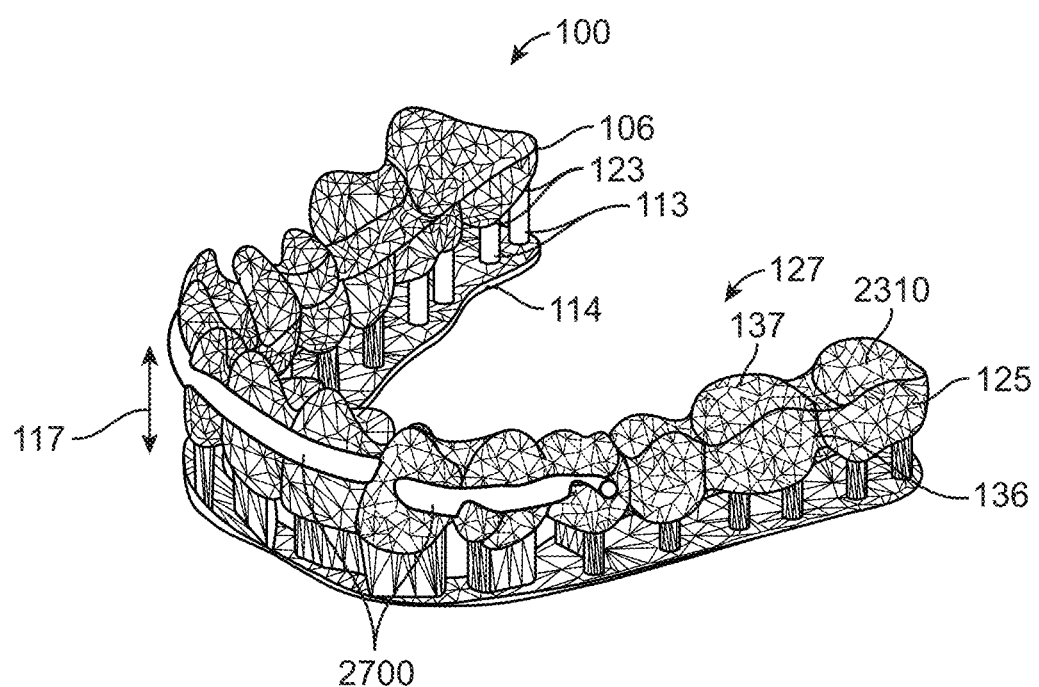
FIG. 27 shows an appliance precursor comprising an appliance stiffener, in accordance with some embodiments.

FIG. 27 shows an appliance precursor 100 comprising an appliance 106 with an appliance stiffener 2700. The appliance stiffener 2700 can be configured in many ways. In some embodiments, the appliance stiffener extends along a wall of the appliance adjacent a plurality of teeth receiving cavities so as to add stiffness for movement of the teeth received in the plurality of cavities. In some embodiments, the stiffener comprises a region of increased thickness on the appliance as compared with other regions of the appliances, so as to apply increased forces to one or more teeth. In some embodiments, the stiffener comprises an integrally formed component of the appliance. For example, the stiffener may comprise a plurality of deposition layers as described herein, in which the plurality of deposition layers extends from the stiffener to an interior surface of the appliance comprising the plurality of teeth receiving cavities.

The stiffener 2700 can be added to the appliance 106 for stiffening the appliance. In addition to holding the shape under various manufacturing process, the stiffener 2700 may help increase orthodontic forces to move teeth. The stiffener 2700 may comprise a portion of the appliance placed on the patient's teeth.

Figure 28:
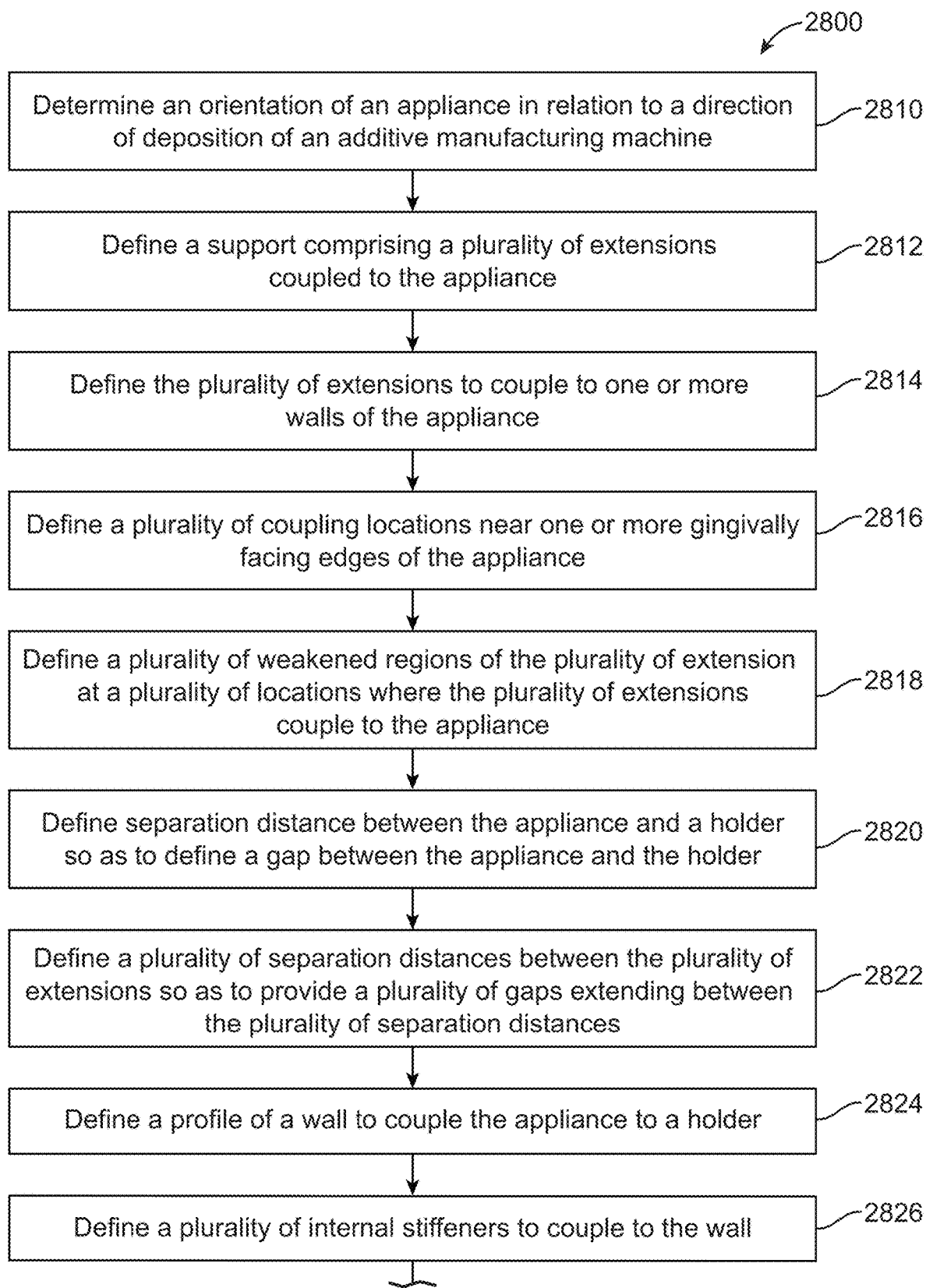
FIG. 28 shows a method of manufacturing an appliance in accordance with some embodiments.
Figure 28:
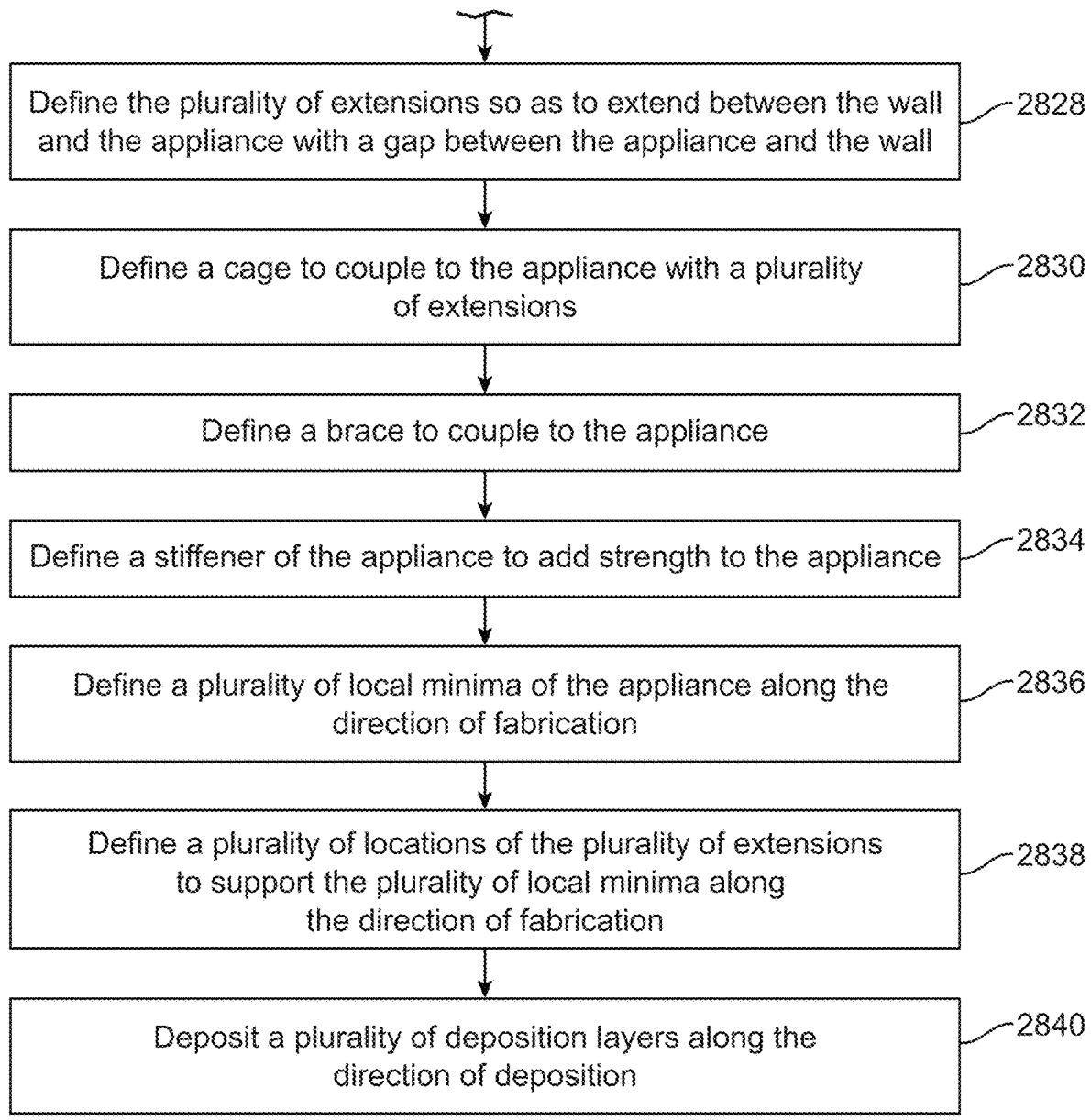

FIG. 28 shows a method 2800 of manufacturing an appliance.

At a step 2810, an orientation of an appliance in relation to a direction of deposition of an additive manufacturing machine is determined. The orientation of the appliance may comprise any orientation disclosed herein. The direction of deposition may comprise any orientation of the direction of deposition as disclosed herein.

At a step 2812 a support comprising a plurality of extensions coupled to the appliance is defined. The plurality of extensions may comprise any of the extensions disclosed herein.

At a step 2814, the plurality of extensions is defined to couple to one or more walls of the appliance. The appliance may comprise any appliance as disclosed herein, and the plurality of locations may comprise any locations as disclosed herein.

At a step 2816, a plurality of coupling locations near one or more gingivally facing edges of the appliance is defined. The plurality of coupling locations may comprise any coupling locations as disclosed herein.

At a step 2818, a plurality of weakened regions of the plurality of extension is defined at a plurality of locations where the plurality of extensions couple to the appliance. The plurality of weakened regions may comprise any weakened region or weakened portion as disclosed herein.

At a step 2820, a separation distance between the appliance and a holder is defined so as to define a gap between the appliance and the holder. The separation distance and gap may comprise any distance and gap as disclosed herein.

At a step 2822, a plurality of separation distances between the plurality of extensions is defined so as to provide a plurality of gaps extending between the plurality of separation distances. The plurality of distances and the gaps may comprise any separation distances and gaps as disclosed herein.

At a step 2824, a profile of a wall is defined to couple the appliance to a holder. The wall may comprise any wall as disclosed herein.

At a step 2826, a plurality of internal stiffeners is defined so as to couple to the wall. The internal stiffeners may comprise any stiffeners as disclosed herein.

At a step 2828, the plurality of extensions is defined so as to extend between the wall and the appliance with a gap between the appliance and the wall, the plurality of extensions extending across the gap. The extensions, the appliance, the gap and the wall may comprise any combination of those disclosed herein.

At a step, 2830, a cage is defined to couple to the appliance with a plurality of extensions. The cage may comprise any cage as disclosed herein, such as cage 2500, and the extensions, locations and arrangements may comprise any of those disclosed herein.

At a step 2832, a brace is defined so as to couple to the appliance. The brace may comprise any brace as disclosed herein, such as brace 2600, and any structure of the brace can be defined.

At a step 2834, a stiffener of the appliance is defined to add strength to the appliance. The stiffener may comprise any stiffener as disclosed herein, such as stiffener 2700.

At a step 2836, a plurality of local minima of the appliance along the direction of fabrication are defined. The plurality of local minima may comprise any of the local minima as disclosed herein.

At a step 2838, a plurality of locations of the plurality of extensions is defined to support the plurality of local minima along the direction of fabrication. The plurality of locations and extensions may comprise any locations and extensions and related structures as disclosed herein.

As a step 2840, a plurality of deposition layers is deposited along the direction of deposition. The layers may comprise any layers disclosed herein.

The method 2800 is a method of manufacturing an appliance in accordance with some embodiments. A person of ordinary skill in the art will recognize many adaptations and variations. The steps can be performed in any order. Some of the steps can be repeated and some of the steps can be omitted. Additional steps can be added or combined with steps of any method disclosed herein. Also, additional steps can be implemented, such as cleaning the appliance, decoupling the appliance from the support, and polishing the appliance as described herein.

While the steps of the method 2800 can be performed in many ways, in some embodiments, one or more of the steps are performed with a processor comprising instructions configured to perform the one or more steps, for example as described herein with reference to FIG. 15.

EXPERIMENTAL

The inventors have conducted experiments in accordance with the present disclosure and have produced appliances coupled to supports and extensions as described herein. The inventors have taken optical images of the precursor showing the appliance and extensions and deposition layers as described herein.

Figure 29:
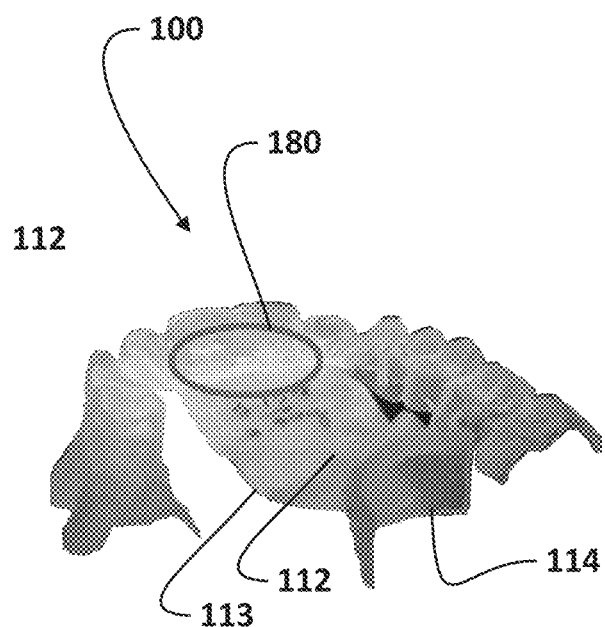
FIG. 29 shows an experimental precursor to a dental appliance, in accordance with some embodiments.

FIG. 29 illustrates an example of a precursor to a dental appliance manufactured according to the described embodiments. Dental appliance precursor 100 comprises a dental appliance 106, support 112, and a holder 114. Ellipse 180 identifies a portion of the dental appliance precursor 100 where the support 112 transitions to dental appliance 106.

Figure 30:
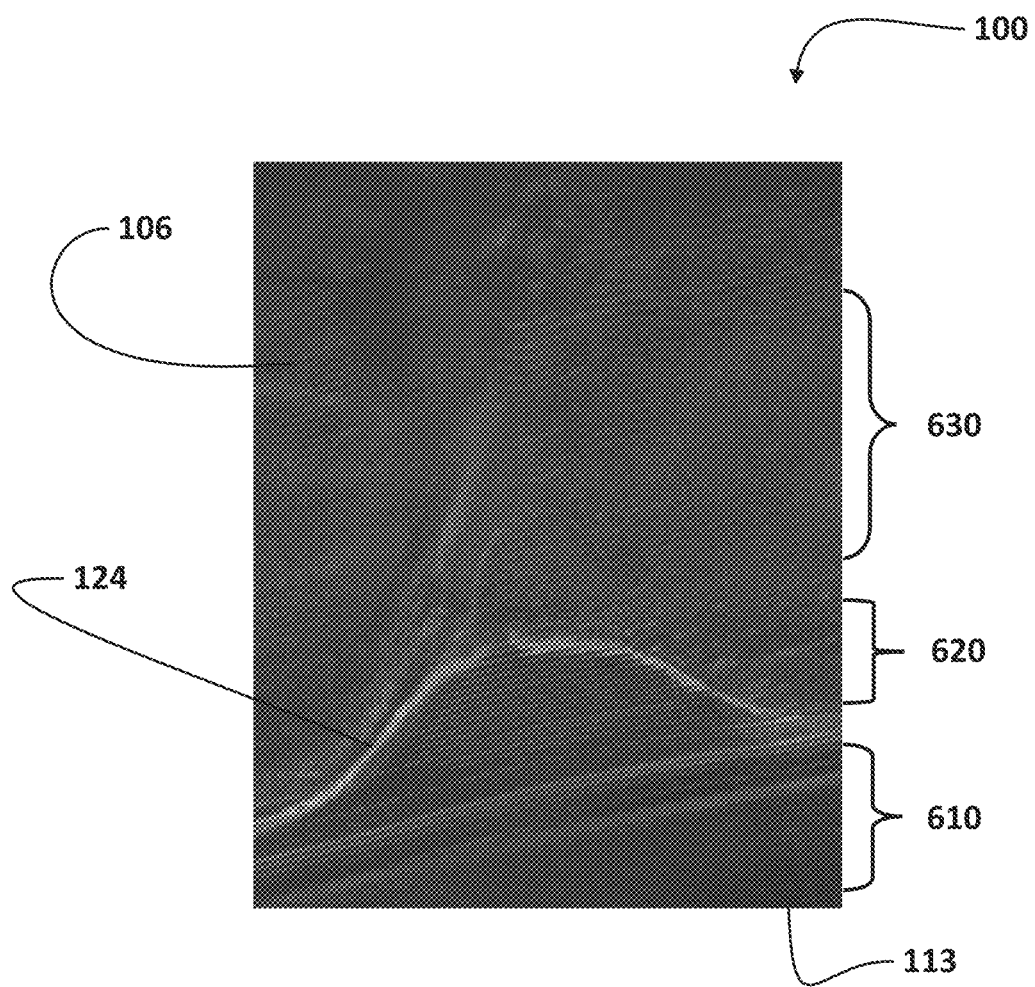
FIG. 30 shows a detailed view of the experimental precursor to a dental appliance illustrating striations that occur during additive manufacturing, in accordance with some embodiments.

FIG. 30 is a close-up view of the portion of the dental appliance precursor 100 identified by ellipse 180 in FIG. 29, which shows the structures describe with reference to FIG. 6. The dental appliance precursor 100 comprises a plurality of layers that are visible as striations in the part. The first plurality of layers 610 corresponds to the extension 113 of the support 112, the second plurality of layers 620 corresponds to a combination of the extension 113 and the first and second portions of the dental appliance 106. The third plurality of layers 630 corresponds to the third portion of dental appliance 106, which couples the first portion to the second portion of the appliance. The removal line 124 is formed between the transition from the support 112 to the dental appliance 106. The dental appliance precursor 100 may be separated at the removal line to obtain the dental appliance 106 as described herein.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of" Finally, for ease of use, the terms "including" and "having" (and their derivatives), as used in the specification and claims, are interchangeable with and shall have the same meaning as the word "comprising".

The processor as disclosed herein can be configured with instructions to perform any one or more steps of any method as disclosed herein.

As used herein, the term "or" is used inclusively to refer items in the alternative and in combination.

As used herein, the term "and/or" is used inclusively to refer items in the alternative and in combination.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, characters such as numerals refer to like elements.

The present disclosure includes the following numbered clauses.

Clause 1. A dental appliance precursor, comprising: a dental appliance comprising a plurality of teeth receiving cavities, the appliance comprising a buccal wall and a lingual wall to at least partially define the plurality of teeth receiving cavities; and a support comprising a plurality of extensions coupled to the dental appliance, the support comprising a holder to couple to an additive manufacturing machine, the support extending between the holder and the appliance.

Clause 2. The dental appliance precursor of clause 1, wherein the plurality of extensions couple to the appliance at a plurality of locations near one or more gingivally facing edges of the appliance.

Clause 3. The dental appliance precursor of clause 2, wherein the plurality of extensions couple to the appliance along one or more gingivally facing edges of the appliance.

Clause 4. The dental appliance precursor of clause 1, wherein the plurality of extensions couple to the appliance at a plurality of locations with a plurality of weakened regions at the locations.

Clause 5. The dental appliance precursor of clause 1, wherein the plurality of extensions couple to the appliance near a buccal gingivally facing edge of the appliance and a lingual gingivally facing edge of the appliance.

Clause 6. The dental appliance precursor of clause 1, wherein precursor appliance comprises a plurality of weakened regions extending between the plurality of extensions and the appliance.

Clause 7. The dental appliance precursor of clause 6, wherein each of the plurality of weakened regions comprises one or more of one or more of a plurality of perforations, a channel, a plurality of channels, a groove, a plurality of grooves, a fillet, a cavity, a plurality of cavities, a reduced cross sectional area compared to a cross sectional area of the support, a reduced cross sectional area compared to the appliance, a weaker material compared to the appliance, a different material than the appliance, a different weaker material, or a weaker material compared to the support and optionally wherein said weaker material comprises a lower amount of cross-linking compared to the appliance or a higher amount of cross-linking compared to the appliance.

Clause 8. The dental appliance precursor of clause 1, wherein the support comprises a plurality of extensions coupled to an occlusal surface of the appliance at a plurality of locations.

Clause 9. The dental appliance precursor of clause 8, wherein each of the plurality of extensions extends along a direction of fabrication from a holder to the appliance.

Clause 10. The dental appliance precursor of clause 9, wherein the direction of fabrication extends from an occlusal surface of the appliance to an interior surface of the appliance to decrease over curing of material along the interior surface, the interior surface shaped to correspond to an occlusal surface of a tooth.

Clause 11. The dental appliance precursor of clause 8, wherein the occlusal surface comprises a surface contour corresponding to a contour of the plurality of teeth receiving cavities.

Clause 12. The dental appliance precursor of clause 8, wherein the plurality of extensions is coupled to the occlusal surface at a plurality of locations corresponding to a plurality of tooth receiving cavities.

Clause 13. The dental appliance precursor of clause 12, wherein the plurality of locations corresponds to the plurality of tooth receiving cavities.

Clause 14. The dental appliance precursor of clause 13, wherein the plurality of locations corresponds to a plurality of local minima along a direction of fabrication of the appliance in order to decreases island formation at the plurality of locations.

Clause 15. The dental appliance precursor of clause 14, wherein the plurality of local minima corresponds to a single tooth and the occlusal surface of the appliance corresponds to the occlusal surface of the tooth.

Clause 16. The dental appliance precursor of clause 1, wherein plurality of extensions couple to the appliance along one or more of the buccal wall or the lingual wall.

Clause 17. The dental appliance precursor of clause 16, wherein plurality of extensions comprises sufficient stiffness to decrease warpage of the appliance between the buccal wall the lingual wall.

Clause 18. The dental appliance precursor of clause 17, wherein the plurality of extensions comprises sufficient stiffness to decrease warpage related to a distance between the buccal wall and the lingual wall.

Clause 19. The dental appliance precursor of clause 16, wherein a first plurality of extensions is coupled to the buccal wall at a first plurality of locations and a second plurality of extensions is coupled to the lingual wall at a second plurality of locations.

Clause 20. The dental appliance precursor of clause 19, wherein the first plurality of extensions is coupled to the buccal wall near a gingivally facing edge of the buccal wall and the second plurality of extensions is coupled to the lingual wall near a gingivally facing edge of the lingual wall.

Clause 21. The dental appliance precursor of clause 19, wherein a first plurality of extensions coupled to the buccal wall comprises a first plurality of weakened regions and a second plurality extensions coupled to the lingual wall comprises a second plurality of weakened regions.

Clause 22. The dental appliance precursor of clause 16, the support comprises a wall extending from the holder, wherein the plurality of extensions extend from the wall to the one or more of the buccal wall or the lingual wall.

Clause 23. The dental appliance precursor of clause 22, wherein a gap extends between the wall of the support and the one or more of the buccal wall or the lingual wall of the appliance and wherein the plurality of extensions extends across the gap.

Clause 24. The dental appliance precursor of clause 22, wherein the wall of the support extends on a buccal side of the appliance and a lingual side of the appliance.

Clause 25. The dental appliance precursor of clause 24, wherein the wall of the support comprises one or more apertures to decrease suction or drain fluid.

Clause 26. The dental appliance precursor of clause 1, further comprising a cage, the cage comprising a band and a plurality of extensions, the band extending at least partially around a portion of the appliance, the plurality of extensions extending from the band to the to the appliance to couple to the appliance at a plurality of locations.

Clause 27. The dental appliance precursor of clause 26, wherein the plurality of extensions couples to the portion of the appliance.

Clause 28. The dental appliance precursor of clause 26, wherein the band extends around the portion of the appliance.

Clause 29. The dental appliance precursor of clause 28, wherein the portion of the appliance extends through the band.

Clause 30. The dental appliance precursor of clause 29, wherein the plurality of extensions extends to the portion of the appliance extending through the band.

Clause 31. The dental appliance precursor of clause 26, wherein the band comprises a perimeter corresponding to one or more of a C-shape, an oblong shape, an oval shape, triangle, a polygon, a rectangle, or a square.

Clause 32. The dental appliance precursor of clause 26, wherein the plurality of extensions couples to the appliance along one or more gingivally facing edges of the appliance.

Clause 33. The dental appliance precursor of clause 26, wherein the plurality of extensions couples to the appliance along an interior of the appliance.

Clause 34. The dental appliance precursor of clause 33, wherein the interior of the appliance comprises a tooth facing surface of the appliance.

Clause 35. The dental appliance precursor of clause 1, further comprising a brace extending from the holder to a wall of the appliance, the wall comprising one or more of the buccal wall or the lingual wall, wherein the brace comprises one or more portions extending laterally away from the holder and the wall.

Clause 36. The dental appliance precursor of clause 35, wherein the brace couples to the wall near a gingivally facing edge of the wall.

Clause 37. The dental appliance precursor of clause 35, wherein the brace couples to the wall at a location within 1 mm of the gingivally facing edge of the wall.

Clause 38. The dental appliance precursor of clause 35, wherein the brace couples to the wall along the gingivally facing edge of the wall.

Clause 39. The dental appliance precursor of clause 1, further comprising a brace extending between the buccal wall and the lingual wall of the appliance.

Clause 40. The dental appliance precursor of clause 39, wherein the brace couples to the buccal wall near a gingivally facing edge of the buccal wall.

Clause 41. The dental appliance precursor of clause 40, wherein the brace couples to the buccal wall within 1 mm of the gingivally facing edge of the buccal wall.

Clause 42. The dental appliance precursor of clause 40, wherein the brace couples to the buccal wall along the gingivally facing edge of the buccal wall.

Clause 43. The dental appliance precursor of clause 39, wherein the brace couples to the lingual wall near a gingivally facing edge of the lingual wall.

Clause 44. The dental appliance precursor of clause 43, wherein the brace couples to the lingual wall within 1 mm of the gingivally facing edge of the lingual wall.

Clause 45. The dental appliance precursor of clause 44, wherein the brace couples to the lingual wall along the gingivally facing edge of the lingual wall.

Clause 46. The dental appliance precursor of clause 1, wherein the appliance comprises a stiffener extending along a wall of the appliance comprising a plurality of teeth receiving cavities.

Clause 47. The dental appliance precursor of clause 46, wherein the stiffener comprises a region of increased thickness on the appliance as compared with other regions of the appliances, so as to apply increased forces to one or more teeth.

Clause 48. The dental appliance precursor of clause 46, comprises an integrally formed component of the appliance.

Clause 49. The dental appliance precursor of clause 46, wherein the stiffener comprises a plurality of deposition layers, the plurality of deposition layers extending from the stiffener to an interior surface of the appliance comprising the plurality of teeth receiving cavities.

Clause 50. A method of manufacturing an appliance, comprising: determining an orientation of an appliance in relation to a direction of deposition of an additive manufacturing machine; and defining a support comprising a plurality of extensions coupled to the appliance.

Clause 51. The method of clause 50, further comprising defining the plurality of extensions to couple to one or more walls of the appliance.

Clause 52. The method of clause 50, further comprising defining a plurality of coupling locations near one or more gingivally facing edges of the appliance.

Clause 53. The method of clause 50, further comprising defining a plurality of weakened regions of the plurality of extension at a plurality of locations where the plurality of extensions couple to the appliance.

Clause 54. The method of clause 50, further comprising defining a separation distance between the appliance and a holder so as to provide a gap between the appliance and the holder.

Clause 55. The method of clause 54, further comprising defining a plurality of separation distances between the plurality of extensions so as to provide a plurality of gaps extending between the plurality of separation distances.

Clause 56. The method of clause 50, further comprising defining a profile of a wall to couple the appliance to a holder.

Clause 57. The method of clause 56, further comprising defining a plurality of internal stiffeners to couple to the wall.

Clause 58. The method of clause 56, further comprising defining the plurality of extensions to extend between the wall and the appliance with a gap between the appliance and the wall, the plurality of extensions extending across the gap.

Clause 59. The method of clause 50, further comprising defining a cage to couple to the appliance.

Clause 60. The method of clause 50, further comprising defining a brace to couple to the appliance.

Clause 61. The method of clause 50, further comprising defining a stiffener of the appliance to add strength to the appliance.

Clause 62. The method of clause 50, further comprising defining a plurality of local minima of the appliance along the direction of fabrication.

Clause 63. The method of clause 58, further comprising defining a plurality of locations of the plurality of extensions to support the plurality of local minima along the direction of fabrication.

Clause 64. The method of clause 50, further comprising depositing a plurality of deposition layers along the direction of deposition.

Clause 65. A dental appliance precursor, comprising: a dental appliance comprising a plurality of teeth receiving cavities, the appliance comprising a buccal wall and a lingual wall to at least partially define the plurality of teeth receiving cavities; and a support coupled to an edge of the dental appliance along one or more of the buccal wall or the lingual wall, the support comprising a holder to couple to an additive manufacturing machine, the support extending between the edge and the holder.

Clause 66. The dental appliance precursor of clause 65, further comprising a removal line extending between the support and the dental appliance, wherein the removal line comprises a transition from the support to the dental appliance.

Clause 67. The dental appliance precursor of clause 65, wherein the appliance further comprises an occlusal surface.

Clause 68. The dental appliance precursor of clause 66, wherein the removal line comprises a weakened portion extending between the support and the appliance.

Clause 69. The dental appliance precursor of clause 68, wherein the weakened portion of the support comprises one or more of a plurality of perforations, a channel, a plurality of channels, a groove, a plurality of grooves, a cavity, a plurality of cavities, a reduced cross sectional area compared to a cross sectional area of the support, a reduced cross sectional area compared to the appliance, a weaker material compared to the appliance, a different material than the appliance, a different weaker material, or a weaker material compared to the support and optionally wherein said weaker material comprises a lower amount of cross-linking compared to the appliance or a higher amount of cross-linking compared to the appliance.

Clause 70. The dental appliance precursor of clause 65, wherein the dental appliance comprises a protruding outer surface and the edge extends along the protruding outer surface and optionally wherein the dental appliance comprises a thin walled polymeric shell appliance and the protruding outer surface corresponds to portion a tooth receiving cavity sized and shaped to receive the tooth.

Clause 71. The dental appliance precursor of clause 65, wherein the dental appliance comprises one or more of an aligner for aligning a plurality of teeth, a retainer, a palatal expander, a bracket for placing attachments on a plurality of teeth, an attachment for coupling to teeth, a mandibular relocation appliance, a mandibular advancement appliance, a retainer with palatal support, a Theroux retainer, a nightguard, a functional appliance, or a 3D printed aligner thermoforming mold.

Clause 72. The dental appliance precursor of clause 65, wherein the support comprises a plurality of extensions extending to a plurality of locations along the edge, the plurality of extensions coupled to the holder and optionally wherein the plurality of extensions extends around voids in the support.

Clause 73. The dental appliance precursor of clause 65, wherein the support comprises an extension between the holder and the appliance, the extension comprising one or more of a uniform thickness, a non-uniform thickness, voids within the extension, a hollow portion within the extension, a filled in portion, a solid filled in portion without voids, or a gradient thickness from the holder to the dental appliance.

Clause 74. The dental appliance precursor of clause 65, wherein the support comprises a plurality of extensions extending into a plurality of teeth receiving cavities of the appliance, and optionally wherein the plurality of extensions is coupled to the appliance at a plurality of locations within the plurality of teeth receiving cavities.

Clause 75. The dental appliance precursor of clause 65, wherein the holder extends along a surface decoupled from the additive manufacturing machine, and wherein an occlusal plane of the appliance extends at an angle to the surface, the angle within a range from about 10 degrees to about 90 degrees and optionally wherein the angle is within a range from about 45 degrees to about 90 degrees and further optionally within a range from about 50 degrees to about 85 degrees.

Clause 76. The dental appliance precursor of clause 65, wherein a portion of the support is coupled to an exterior surface of the appliance at a location corresponding to a posterior surface of a posterior molar and optionally wherein the support comprises a plurality of extensions extending to the edge at a plurality of locations, wherein the plurality of extensions is spaced apart from the portion with a plurality of voids in the support between the plurality of extensions and the portion coupled to the exterior surface.

Clause 77. The dental appliance precursor of clause 65, wherein an extension of the support between the holder and the appliance comprises a supporting wall branching into at least two support walls and optionally wherein said supporting wall branches into the at least two support walls from a single point.

Clause 78. The dental appliance precursor of clause 65, wherein the edge corresponds to a perimeter along a gingival side of the appliance.

Clause 79. The dental appliance precursor of clause 65, wherein the edge corresponds to a perimeter along a gingival side of the appliance.

Clause 80. The dental appliance precursor of clause 65, wherein the support comprises a wall to support the edge of the dental appliance.

Clause 81. The dental appliance precursor of clause 80, wherein the wall comprises a first wall coupled to a buccal edge of the appliance and a second wall coupled to a lingual edge of the appliance.

Clause 82. The dental appliance precursor of clause 81, wherein the wall comprises a plurality of openings to drain fluid.

Clause 83. The dental appliance precursor of clause 81, further comprising a plurality of stiffeners extending between the first wall and the second wall.

Clause 84. The dental appliance precursor of clause 83, wherein the plurality of stiffeners comprises one or more of a plurality of trusses or a plurality of struts.

Clause 85. The dental appliance precursor of clause 83, wherein the plurality of stiffeners comprises a plurality of trusses arranged in a triangular pattern extending between the first wall and the second wall.

Clause 86. The dental appliance precursor of clause 81, wherein the edge of the appliance comprises a shape profile and wherein the wall of the support corresponds to the shape profile of the edge.

Clause 87. The dental appliance of clause 86, wherein the wall extends from the edge to the holder with a shape profile.

Clause 88. A method of manufacturing a dental appliance comprising: depositing a first plurality of layers of material on a retention surface of an additive manufacturing machine; and depositing a second plurality of layers of material on the first plurality of layers to form an extension of the support and a portion of the appliance, the extension coupled to the portion of the appliance along an edge of the appliance.

Clause 89. The method of clause 88, wherein the edge comprises an edge of a wall of a tooth receiving cavity of the dental appliance.

Clause 90. The method of clause 88, further comprising depositing a third plurality of layers of material on the second plurality of layers to form a second portion of the dental appliance on the extension, wherein the second portion of the appliance is coupled to the second plurality of layers of material along an edge of the second portion of the dental appliance.

Clause 91. The method of clause 90, wherein the portion comprises a first portion of the appliance, and wherein the first portion of the appliance is separated from the second portion of the appliance by a distance with a gap in the appliance between the first portion and the second portion and optionally wherein the extension comprise a first extension coupled to the first portion and a second extension coupled to the second portion.

Clause 92. The method of clause 91, further comprising: depositing a fourth plurality of layers of material on the appliance to form a third portion of the appliance, the third portion of the appliance coupling the first portion of the appliance to the second portion of the appliance.

Clause 93. The method of clause 92, wherein the third portion of the appliance extends from the first portion of the appliance to the second portion of the appliance.

Clause 94. The method of clause 88, wherein the dental appliance comprises a plurality of cavities shaped to receive teeth and wherein the edge comprises a protruding outer surface of one or more of the of the plurality of cavities of the dental appliance.

Clause 95. The method of clause 88, further comprising separating the extension from the appliance along the edge of the appliance.

Clause 96. The method of clause 95, wherein the extension is separated from the appliance along the edge with one or more of cutting, mechanical cutting, laser cutting, mechanical fracture, polishing, dissolving, or washing semi-cured material and optionally wherein the edge corresponds to a removal line.

Clause 97. A dental appliance for placement on a plurality of teeth of a subject, the appliance comprising: a buccal wall and a lingual wall at least partially defining plurality of tooth receiving cavities sized and shaped to receive the plurality of teeth, said buccal wall and lingual wall comprising a plurality of deposition layers from an additive manufacturing process; and a removal edge extending along at least a portion the buccal wall or the lingual wall, wherein said removal edge corresponds to material separated from the buccal wall or the lingual wall.

Clause 98. The dental appliance of clause 97, wherein said removal edge extends at least partially between an interior side of the wall and an exterior side of the wall and optionally wherein said interior side is oriented to receive the plurality of teeth and the exterior side faces away from the interior side.

Clause 99. The dental appliance of clause 97, wherein said removal edge traverses a plurality of layer lines corresponding to the plurality of deposition layers.

Clause 100. The dental appliance of clause 99, wherein said removal edge comprises an exteriorly protruding removal edge of said appliance and said plurality of layer lines extends between a first portion and a second portions of said protruding removal edge with different distances in order to at least partially define a shape of said exteriorly protruding removal edge.

Clause 101. The dental appliance of clause 100, wherein said plurality of layer lines comprises a first layer line extending a first distance between the first portion of the removal edge the second portion of the removal edge and a second layer line extending a second distance between the first portion of the removal edge and the second portion of the removal edge, said layer line closer to an apex of the protruding removal edge than said second layer line, said first distance less than said second distance.

Clause 102. The dental appliance of clause 97, wherein said dental appliance comprises a plurality of curved layer lines on a surface of the dental appliance.

Clause 103. The dental appliance of clause 102, wherein each of said plurality of curved layer lines extends along a plane substantially parallel to at least a portion of said removal edge.

Clause 104. The dental appliance of clause 102, wherein said plurality of curved layer lines corresponds to a direction of movement of said appliance during direct fabrication.

Clause 105. The dental appliance of clause 102, wherein said plurality of curved layer lines corresponds to a plurality of deposition layers of the appliance.

Clause 106. The dental appliance of clause 104, wherein said plurality of deposition layers extend substantially orthogonal to the direction of movement.

Clause 107. The dental appliance of clause 97, wherein said each of said plurality of tooth receiving cavities is shaped to receive at least a portion of a tooth.

Clause 108. The dental appliance of clause 97, wherein said removal edge corresponds to an edge of support coupled to said wall along said removal edge during additive manufacturing of said appliance.

Clause 109. The dental appliance of clause 97, wherein said removal edge comprises one or more of a cut edge, a laser cut edge, a mechanically cut edge, a fractured edge, a perforated edge, a torn edge, a dissolved edge, a washed edge or a polished edge.

Clause 110. The dental appliance of clause 97, wherein said appliance comprises a polymeric shell, said shell comprising a thickness of no more than about 1 mm and optionally no more than about 0.2 mm to 2 mm.

Clause 111. The dental appliance of clause 97, further comprising an occlusal portion extending between said buccal wall and said lingual wall.

Clause 112. The dental appliance of clause 97, further comprising a plurality of removal edges.

Clause 113. The dental appliance of any one of the preceding clauses, further comprising a plurality of deposition layers, wherein said plurality of deposition layers is inclined at an angle to an occlusal plane of the appliance, said angle within a range from about 45 degrees to about 90 degrees and optionally within a range from about 50 degrees to about 85 degrees.

Clause 114. A dental appliance, comprising: a thin polymeric shell comprising plurality of deposition layers to define a plurality of teeth receiving cavities, the plurality of deposition layers corresponding to a direction of deposition during additive deposition of the plurality of layers, the plurality of teeth receiving cavities comprising a plurality of protrusions and indentations along internal surfaces of the cavities and corresponding indentations and protrusions, respectively, along external surfaces of the plurality of cavities, wherein a layer among the plurality layers comprises a portion corresponding to a local minimum along the direction of deposition, and wherein the portion comprises a removal surface from which supporting material has been removed subsequent to deposition of the layer at the local minimum.

Clause 115. The dental appliance of clause 114, wherein the portion of the layer is surrounded by a gap along a perimeter of the layer and wherein the portion is coupled to other layers of the plurality of layers.

Clause 116. The dental appliance of clause 114, further comprising a plurality of layers comprising plurality of portions corresponding to a plurality of local minima, wherein each of the plurality of portions is surrounded by a gap along a perimeter and coupled to other layers of the plurality of layers.

Clause 117. A dental appliance, comprising: a thin polymeric shell comprising plurality of layers to define a plurality of teeth receiving cavities, wherein the plurality of layers is inclined at an angle to an occlusal plane of the plurality of teeth, wherein the angle is with within a range from about 45 degrees to about 90 degrees and optionally within a range from about 50 degrees to about 85 degrees.

Clause 118. A method of fabricating a dental appliance, comprising: determining a direction of deposition of a plurality of layers along the appliance; identifying a plurality of local minima of the appliance along the direction of deposition; and arranging a plurality of support structures to couple to the plurality of local minima.

Clause 119. The method of clause 118, further comprising determining an angle of the appliance in relation to direction of deposition in order to decrease a number of the plurality of local minima.

Clause 120. The method of clause 118, wherein each of the plurality of local minima comprises a deposition layer, and wherein said layer is surrounded by a gap along a perimeter of the layer when the layer is formed.

Clause 121. The method of clause 118, further comprising defining a removal line to separate the appliance from the plurality of support structures.

Clause 122. The method of clause 118, further comprising defining a plurality of transitions between the plurality of local minima and the plurality of support structures, the plurality of transitions configured to decouple the plurality of local minima from the plurality of supports structures.

Clause 123. The method, dental appliance, or dental appliance precursor of any one of the preceding clauses, wherein a removal edge corresponds to material separated from a buccal wall or a lingual wall of the appliance.

Clause 124. The method, appliance, dental appliance, or dental appliance precursor of any one of the preceding clauses wherein the appliance comprises one or more of an aligner for aligning a plurality of teeth, a retainer, a palatal expander, a bracket for placing attachments on a plurality of teeth, an attachment for coupling to teeth, a mandibular relocation appliance, a mandibular advancement appliance, a retainer with palatal support, a Theroux retainer, a nightguard, a functional appliance, or a 3D printed aligner thermoforming mold.

Embodiments of the present disclosure have been shown and described as set forth herein and are provided by way of example only. One of ordinary skill in the art will recognize numerous adaptations, changes, variations, and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof

What is claimed is:

1. An orthodontic dental appliance precursor, comprising:
a dental appliance comprising a plurality of teeth receiving cavities shaped to receive and reposition a tooth of a patient, the appliance comprising a buccal wall and a lingual wall to at least partially define the plurality of teeth receiving cavities, the buccal wall and lingual wall having one or more gingivally facing edges; and
a support comprising a plurality of extensions coupled to the dental appliance at the one or more gingivally facing edges of the appliance, the support comprising a holder to couple to an additive manufacturing machine, the support extending between the holder and the appliance.

2. The dental appliance precursor of claim 1, wherein the plurality of extensions couple to the appliance at a plurality of locations near one or more gingivally facing edges of the appliance.

3. The dental appliance precursor of claim 1, wherein the plurality of extensions couple to the appliance at a plurality of locations with a plurality of weakened regions at the locations.

4. The dental appliance precursor of claim 1, wherein the plurality of extensions couple to the appliance near a buccal gingivally facing edge of the appliance and a lingual gingivally facing edge of the appliance.

5. The dental appliance precursor of claim 1, wherein the precursor appliance comprises a plurality of weakened regions extending between the plurality of extensions and the appliance.

6. The dental appliance precursor of claim 5, wherein each of the plurality of weakened regions comprises one or more of one or more of a plurality of perforations, a channel, a plurality of channels, a groove, a plurality of grooves, a fillet, a cavity, a plurality of cavities, a reduced cross sectional area compared to a cross sectional area of the support, a reduced cross sectional area compared to the appliance, a weaker material compared to the appliance, a different material than the appliance, a different material that is weaker compared to the appliance, or a weaker material compared to the support.

7. The dental appliance precursor of claim 1, wherein the plurality of extensions are coupled to an occlusal surface of the appliance at a plurality of locations.

8. The dental appliance precursor of claim 7, wherein each of the plurality of extensions extends along a direction of fabrication from a holder to the appliance.

9. The dental appliance precursor of claim 8, wherein the direction of fabrication extends from an occlusal surface of the appliance to an interior surface of the appliance to decrease over curing of material along the interior surface, the interior surface shaped to correspond to an occlusal surface of a tooth.

10. The dental appliance precursor of claim 7, wherein the occlusal surface comprises a surface contour corresponding to a contour of the plurality of teeth receiving cavities.

11. The dental appliance precursor of claim 1, wherein the plurality of extensions couple to the appliance along one or more of the buccal wall or the lingual wall.

12. The dental appliance precursor of claim 11, wherein the plurality of extensions comprises sufficient stiffness to decrease warpage of the appliance between the buccal wall the lingual wall.

13. The dental appliance precursor of claim 12, wherein the plurality of extensions comprises sufficient stiffness to decrease warpage related to a distance between the buccal wall and the lingual wall.

14. The dental appliance precursor of claim 11, wherein the plurality of extensions includes a first plurality of extensions coupled to the buccal wall at a first plurality of locations and a second plurality of extensions coupled to the lingual wall at a second plurality of locations.

15. The dental appliance precursor of claim 14, wherein the first plurality of extensions is coupled to the buccal wall near a gingivally facing edge of the buccal wall and the second plurality of extensions is coupled to the lingual wall near a gingivally facing edge of the lingual wall.

16. A dental appliance precursor, comprising:
 a dental appliance comprising a plurality of teeth receiving cavities, the appliance comprising a buccal wall and a lingual wall to at least partially define the plurality of teeth receiving cavities;
 a support comprising a plurality of extensions coupled to the dental appliance, the support comprising a holder to couple to an additive manufacturing machine, the support extending between the holder and the appliance
 wherein the plurality of extensions are coupled to an occlusal surface of the appliance at a plurality of locations corresponding to a plurality of tooth receiving cavities.

17. The dental appliance precursor of claim 16, wherein the plurality of locations corresponds to a plurality of local minima along a direction of fabrication of the appliance in order to decrease island formation at the plurality of locations.

18. The dental appliance precursor of claim 17, wherein the plurality of local minima corresponds to a single tooth and the occlusal surface of the appliance corresponds to the occlusal surface of the tooth.

* * * * *